US011811516B2

(12) United States Patent
Milton et al.

(10) Patent No.: US 11,811,516 B2
(45) Date of Patent: Nov. 7, 2023

(54) SYSTEM AND METHOD FOR INTERNET NUMBERS ASSET MANAGEMENT

(71) Applicant: Verizon Patent and Licensing Inc., Basking Ridge, NJ (US)

(72) Inventors: Roger Milton, Tampa, FL (US); Stephen R. Middleton, Manassas, VA (US); Raghavendra Jayaram, Bangalore (IN); Raman P. Jankiram, Chennai (IN); Praveen K. Nidumolu, Reston, VA (US); Sanjay R. Vyas, Hyderabad (IN); Jebaraj Daniel Kennet Jeyakumar, Apex, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/387,652

(22) Filed: Jul. 28, 2021

(65) Prior Publication Data
US 2023/0042307 A1 Feb. 9, 2023

(51) Int. Cl.
*H04L 61/5046* (2022.01)
*G06N 20/00* (2019.01)
*H04L 61/5061* (2022.01)
*H04L 61/5076* (2022.01)

(52) U.S. Cl.
CPC ......... *H04L 61/5046* (2022.05); *G06N 20/00* (2019.01); *H04L 61/5061* (2022.05); *H04L 61/5076* (2022.05)

(58) Field of Classification Search
CPC ......... H04L 61/09; H04L 61/45; H04L 61/50; H04L 61/5007; H04L 61/5046; H04L 61/5053; H04L 61/5061; H04L 61/5076; H04L 41/16; H04L 43/10
See application file for complete search history.

(56) References Cited

U.S. PATENT DOCUMENTS

| | | | |
|---|---|---|---|
| 9,300,625 B1 * | 3/2016 | Potlapally | G06Q 10/10 |
| 9,935,816 B1 * | 4/2018 | Chen | H04L 41/052 |
| 10,270,644 B1 * | 4/2019 | Valsecchi | H04L 41/16 |
| 10,893,022 B1 * | 1/2021 | Li | H04L 45/748 |
| 10,924,452 B1 * | 2/2021 | Nikolayev | H04L 61/5046 |
| 10,972,427 B1 * | 4/2021 | Hu | H04L 61/5046 |

(Continued)

OTHER PUBLICATIONS

Rooney, Timothy. IP Address Management: Principles and Practice. John Wiley & Sons, 2011. pp. 305-346 (Year: 2011).*

(Continued)

*Primary Examiner* — Vivek Srivastava
*Assistant Examiner* — William C McBeth

(57) ABSTRACT

A system and method for internet numbers management is provided. Historical internet protocol (IP) block information associated with a plurality of IP blocks is received from a server database. The historical IP block information includes IP block size information and IP block type information. A machine learning model is trained based on the historical IP block information. Predictions are received from the trained machine learning model indicating a pool of IP blocks of the plurality of IP blocks to be audited. An electronic action is generated to obtain validation status information for each IP block of the pool of IP blocks. The historical IP block information in the server database is updated with the validation status information for each IP block of the pool of IP blocks.

19 Claims, 16 Drawing Sheets

(56) References Cited

U.S. PATENT DOCUMENTS

| | | | |
|---|---|---|---|
| 11,456,987 B1* | 9/2022 | McKim | H04L 61/5007 |
| 2004/0199520 A1* | 10/2004 | Ruiz | H04L 61/302 |
| 2006/0126636 A1* | 6/2006 | Dooley | H04L 61/5061 |
| | | | 370/254 |
| 2011/0004589 A1* | 1/2011 | Rischar | G05B 19/4185 |
| | | | 700/32 |
| 2017/0236079 A1* | 8/2017 | Venna | H04L 61/5007 |
| | | | 705/4 |
| 2018/0375822 A1* | 12/2018 | Dahlberg | H04L 61/5007 |
| 2020/0244699 A1* | 7/2020 | Hutchinson | H04L 41/16 |
| 2021/0073661 A1* | 3/2021 | Matlick | H04L 61/5007 |
| 2021/0075689 A1* | 3/2021 | Ramanathan | H04L 41/16 |
| 2021/0194916 A1* | 6/2021 | Drake | H04L 41/0853 |
| 2021/0234830 A1* | 7/2021 | Maddu | H04L 61/5046 |
| 2021/0400013 A1* | 12/2021 | Vyas | H04L 61/5007 |

OTHER PUBLICATIONS

Timothy Rooney; Michael Dooley, "IPAM Evolution/Trends," in IP Address Management, IEEE, 2021, pp. 407-417 (Year: 2021).*

Wikipedia contributors. "Artificial neural network." Wikipedia, The Free Encyclopedia. Wikipedia, The Free Encyclopedia, Mar. 1, 2023. Web. Mar. 2, 2023. (Year: 2023).*

* cited by examiner

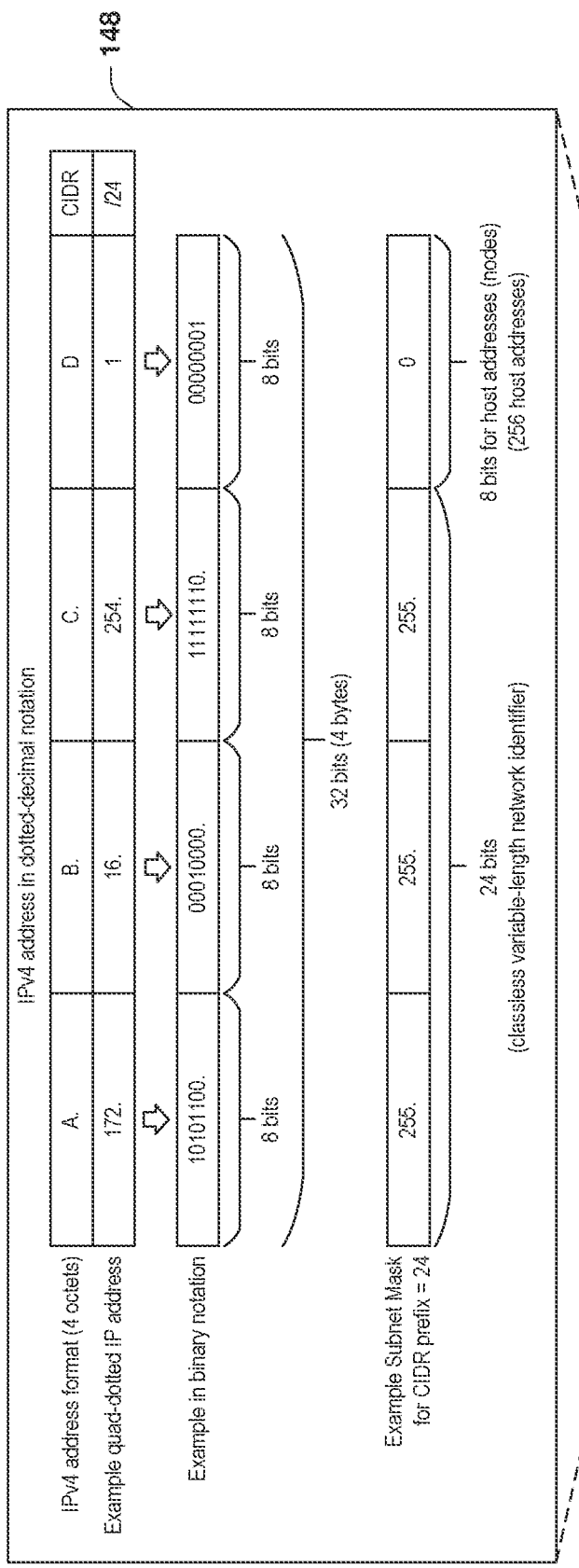
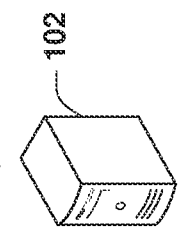
FIG. 1C

IPv4 CIDR Conversion Table

| CIDR prefix length | Dotted Decimal Netmask | Hexidecimal Netmask | Inverse Netmask | Binary | Number of Classfull Networks | Number of Usable IPs |
|---|---|---|---|---|---|---|
| /1 | 128.0.0.0 | 80 00 00 00 | 127.255.255.255 | 1000 0000 0000 0000 0000 0000 0000 0000 | 128 As | 2,147,483,646 |
| /2 | 192.0.0.0 | C0 00 00 00 | 63.255.255.255 | 1100 0000 0000 0000 0000 0000 0000 0000 | 64 As | 1,073,741,822 |
| /3 | 224.0.0.0 | E0 00 00 00 | 31.255.255.255 | 1110 0000 0000 0000 0000 0000 0000 0000 | 32 As | 536,870,910 |
| /4 | 240.0.0.0 | F0 00 00 00 | 15.255.255.255 | 1111 0000 0000 0000 0000 0000 0000 0000 | 16 As | 268,435,454 |
| /5 | 248.0.0.0 | F8 00 00 00 | 7.255.255.255 | 1111 1000 0000 0000 0000 0000 0000 0000 | 8 As | 134,217,726 |
| /6 | 252.0.0.0 | FC 00 00 00 | 3.255.255.255 | 1111 1100 0000 0000 0000 0000 0000 0000 | 4 As | 67,108,862 |
| /7 | 254.0.0.0 | FE 00 00 00 | 1.255.255.255 | 1111 1110 0000 0000 0000 0000 0000 0000 | 2 As | 33,554,430 |
| /8 | 255.0.0.0 | FF 00 00 00 | 0.255.255.255 | 1111 1111 0000 0000 0000 0000 0000 0000 | 1 A or 256 Bs | 16,777,214 |
| /9 | 255.128.0.0 | FF 80 00 00 | 0.127.255.255 | 1111 1111 1000 0000 0000 0000 0000 0000 | 128 Bs | 8,388,606 |
| /10 | 255.192.0.0 | FF C0 00 00 | 0.63.255.255 | 1111 1111 1100 0000 0000 0000 0000 0000 | 64 Bs | 4,194,302 |
| /11 | 255.224.0.0 | FF E0 00 00 | 0.31.255.255 | 1111 1111 1110 0000 0000 0000 0000 0000 | 32 Bs | 2,097,150 |
| /12 | 255.240.0.0 | FF F0 00 00 | 0.15.255.255 | 1111 1111 1111 0000 0000 0000 0000 0000 | 16 Bs | 1,048,574 |
| /13 | 255.248.0.0 | FF F8 00 00 | 0.7.255.255 | 1111 1111 1111 1000 0000 0000 0000 0000 | 8 Bs | 524,286 |
| /14 | 255.252.0.0 | FF FC 00 00 | 0.3.255.255 | 1111 1111 1111 1100 0000 0000 0000 0000 | 4 Bs | 262,142 |
| /15 | 255.254.0.0 | FF FE 00 00 | 0.1.255.255 | 1111 1111 1111 1110 0000 0000 0000 0000 | 2 Bs | 131,070 |
| /16 | 255.255.0.0 | FF FF 00 00 | 0.0.255.255 | 1111 1111 1111 1111 0000 0000 0000 0000 | 1 B or 256 Cs | 65,534 |
| /17 | 255.255.128.0 | FF FF 80 00 | 0.0.127.255 | 1111 1111 1111 1111 1000 0000 0000 0000 | 128 Cs | 32,766 |
| /18 | 255.255.192.0 | FF FF C0 00 | 0.0.63.255 | 1111 1111 1111 1111 1100 0000 0000 0000 | 64 Cs | 16,382 |
| /19 | 255.255.224.0 | FF FF E0 00 | 0.0.31.255 | 1111 1111 1111 1111 1110 0000 0000 0000 | 32 Cs | 8,190 |
| /20 | 255.255.240.0 | FF FF F0 00 | 0.0.15.255 | 1111 1111 1111 1111 1111 0000 0000 0000 | 16 Cs | 4,094 |
| /21 | 255.255.248.0 | FF FF F8 00 | 0.0.7.255 | 1111 1111 1111 1111 1111 1000 0000 0000 | 8 Cs | 2,046 |
| /22 | 255.255.252.0 | FF FF FC 00 | 0.0.3.255 | 1111 1111 1111 1111 1111 1100 0000 0000 | 4 Cs | 1,022 |
| /23 | 255.255.254.0 | FF FF FE 00 | 0.0.1.255 | 1111 1111 1111 1111 1111 1110 0000 0000 | 2 Cs | 510 |
| /24 | 255.255.255.0 | FF FF FF 00 | 0.0.0.255 | 1111 1111 1111 1111 1111 1111 0000 0000 | 1 C | 254 |
| /25 | 255.255.255.128 | FF FF FF 80 | 0.0.0.127 | 1111 1111 1111 1111 1111 1111 1000 0000 | 1/2 C | 126 |
| /26 | 255.255.255.192 | FF FF FF C0 | 0.0.0.63 | 1111 1111 1111 1111 1111 1111 1100 0000 | 1/4 C | 62 |
| /27 | 255.255.255.224 | FF FF FF E0 | 0.0.0.31 | 1111 1111 1111 1111 1111 1111 1110 0000 | 1/8 C | 30 |
| /28 | 255.255.255.240 | FF FF FF F0 | 0.0.0.15 | 1111 1111 1111 1111 1111 1111 1111 0000 | 1/16 C | 14 |
| /29 | 255.255.255.248 | FF FF FF F8 | 0.0.0.7 | 1111 1111 1111 1111 1111 1111 1111 1000 | 1/32 C | 6 |
| /30 | 255.255.255.252 | FF FF FF FC | 0.0.0.3 | 1111 1111 1111 1111 1111 1111 1111 1100 | 1/64 C | 2 |
| /31 | 255.255.255.254 | FF FF FF FE | 0.0.0.1 | 1111 1111 1111 1111 1111 1111 1111 1110 | 1/128 C | 0 |
| /32 | 255.255.255.255 | FF FF FF FF | 0.0.0.0 | 1111 1111 1111 1111 1111 1111 1111 1111 | 1/256 C | 1 |

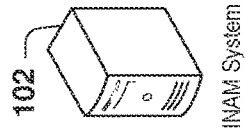

INAM System

FIG. 1D

Reserved private IPv4 network ranges — 152

| Name | CIDR block | Address range | Number of addresses | Classful description |
|---|---|---|---|---|
| 24-bit block | 10.0.0.0/8 | 10.0.0.0 – 10.255.255.255 | 16,777,216 | Single Class A |
| 20-bit block | 172.16.0.0/12 | 172.16.0.0 – 172.31.255.255 | 1,048,576 | Contiguous range of 16 Class B blocks |
| 16-bit block | 192.168.0.0/16 | 192.168.0.0 – 192.168.255.255 | 65,536 | Contiguous range of 256 Class C blocks |

INAM System — 102

| IP Block (Intelligent IP Block Management) | | |
|---|---|---|
| Attributes | Description | Example |
| Owner | name | Provisioning Team |
| Type | fixed or variable | Variable |
| Head | starting IP Address | 230.10.0.0 |
| Tail | ending IP Address | 203.10.0.4 |
| Allocation Size | /32 (usable = size − 2) | 512 |
| Classification Growth | high, medium, low | medium |
| Classification Product | new, intermediate, mature | mature |
| Last Allocated | date | 01/01/2015 |
| Audited | date | 01/05/2018 |
| Fallout | % change from audit record | 15% |
| Name | CIDR block | CIDR block |
| Assignment Size | % IP addresses assigned | 65% |
| user defined | user defined variable | age > 365 days |
| 24-bit IP block | 10.0.0.0/8 | 10.0.0.0/8 |
| 20-bit IP block | 172.16.0.0/12 | 172.16.0.0/12 |
| 16-bit IP block | 192.168.0.0/16 | 192.168.0.0/16 |

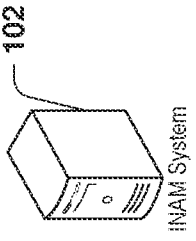

iNAM System

FIG. 1G

SYSTEM AND METHOD FOR INTERNET NUMBERS ASSET MANAGEMENT

BACKGROUND

Connected devices on a public or private network are associated with a network address, such as an IPv4 address or IPv6 address. The associated network addresses may be commissioned or decommissioned during the lifecycle of a connected device. Network addresses may be grouped as blocks. Individual network addresses and blocks may be provisioned, reassigned, and reclaimed according to the lifecycle of connected devices. IPv4 inventory numbers are over 100 million (M), and IPv6 inventory numbers are over 26 nonillion ($26\times10^{21}$). Management of network addresses is typically a time consuming process.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIGS. 1A-1L are diagrams illustrating an example implementation described herein, according to some example embodiments.

DETAILED DESCRIPTION OF EXAMPLE EMBODIMENTS

Figure 1A:
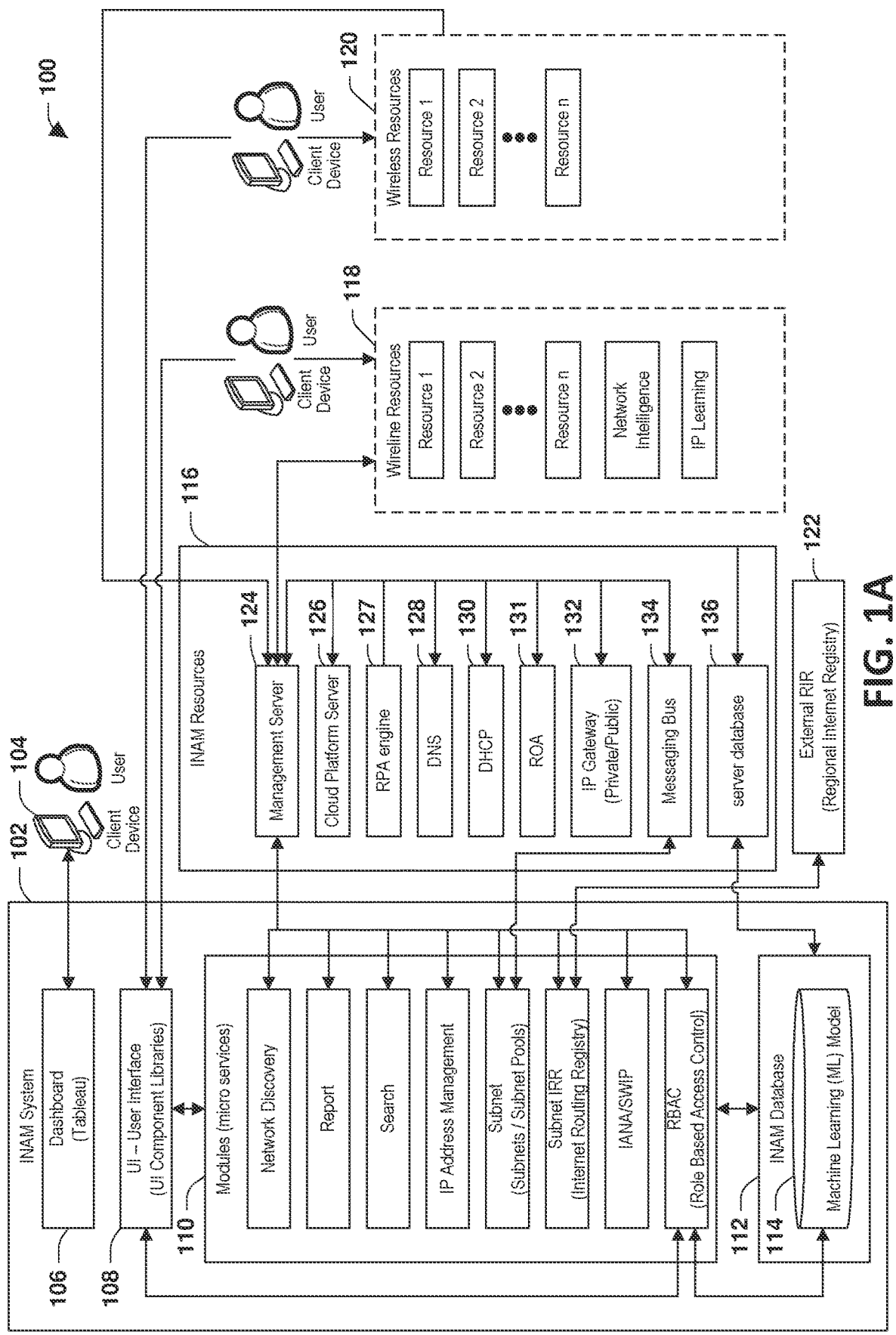

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for internet numbers asset management are provided. In some examples, historical internet protocol (IP) block information associated with a plurality of IP blocks corresponding to an IP block owner may be received from a server database. The historical IP block information may include, for each of the plurality of IP blocks, IP block size information indicating a size of a corresponding IP block and IP block type information indicating a type of a corresponding IP block. A machine learning model may be trained based on the historical IP block information. Predictions may be received from the trained machine learning model indicating a set of IP blocks of the plurality of IP blocks to be audited. An electronic action may be generated based on the received predictions to audit the pool of IP blocks to obtain validation status information for each IP block of the pool of IP blocks. The historical IP block information may be updated in the server database with the validation status information for each IP block of the pool of IP blocks.

Accordingly, as provided herein, an internet numbers process may be performed. In some examples, a device may receive historical IP block information associated with a plurality of IP blocks corresponding to an IP block owner. The historical IP block information may include, for each of the plurality of IP blocks, IP block size information and IP block type information. The device may train a machine learning model based on the historical IP block information. The device may receive predictions from the trained machine learning model indicating a pool of IP blocks of the plurality of IP blocks to be audited. The device may generate an electronic action based on the predictions to audit the pool of IP blocks to obtain validation status information for each IP block of the pool of IP blocks. The historical IP block information may be updated in a server database with the validation status information for each IP block of the pool of IP blocks.

Internet numbers, for example, IP Addresses, may be considered valuable resources, such as in network service provider organizations. Both IPv4 and IPv6 addresses are deployed and scattered across a wide range of network devices in far edge, edge, core, and terminal devices like customer premises equipment (CPE), cellular telephone equipment (CTE), and internet of things (IoT) devices. Machine based intelligence, for example in combination with human interaction, may provide inventory management of internet numbers as an asset.

According to some example embodiments, an inventory management system may provide various roles and responsibilities in groups and/or blocks, such as groups associated with individuals, or blocks of internet protocol (IP) addresses. In an example, an inventory management system may search for patterns of work in the system. A robotic process automation engine may provide natural language processing, and may provide outcomes, recommendations and insights that are comprehensible and/or actionable.

In some example embodiments, IP addresses may be grouped in IP blocks and the IP blocks may be grouped in IP pools. IP pools and/or IP blocks may be used to allocate and manage IP addresses. In some example embodiments, a number of IP pools in an environment, such as a network service provider environment, may be around 50 to 100 thousand. IP blocks may be associated with an IP block owner, an IP block size, and an IP block type. Pools of IP blocks may be associated with an IP block owner, and may include IP blocks having different IP block sizes and different IP block types. In some example embodiments, attributes, such as dynamic attributes, may be provided to manage IP pool information. Attributes associated with the IP blocks may be periodically evaluated and/or updated, and new attributes may be added by auditing, such as with processes executed by machines and/or intelligent machines, and/or humans. Attributes associated with the IP blocks may be used to analyze the IP blocks with supervised and/or unsupervised machine learning.

In some example embodiments, IP pools may be dynamically analyzed, classified and/or updated periodically. Unsupervised learning may be used to analyze an IP pool, identify clusters of IP blocks within an IP pool, detect anomalies in IP blocks, and/or identify features associated with IP blocks in the IP pool. Machine learning and/or artificial intelligence may provide algorithms and/or techniques to prioritize and/or investigate IP blocks. In some example embodiments, an unsupervised learning model may provide tagging of IP blocks along with a design of customized and/or dynamic workflows. In some example embodiments, including automated analysis and investigation, a supervised learning model may be used to identify and/or determine workflows associated with processing IP blocks within an IP pool. In some example embodiments, existing workflows may be updated and/or new workflows may be created to update the supervised model.

FIGS. 1A-1L are diagrams illustrating an example implementation 100 described herein, according to some example embodiments. As shown in FIG. 1A and according to an example, an internet numbers asset management (INAM) system 102 may be a device that provides intelligent asset management of internet numbers. The INAM system 102 may comprise intelligent machine learning (ML)/artificial intelligence (AI) capabilities. The INAM system 102 may support robotic process automation (RPA) through interaction with a client device 104. The INAM system 102 may be configured as a directional, centralized system that manages IPv4 and IPv6 addresses, autonomous system numbers (ASN), border gateway protocol (BGP) communities, and other related systems. The INAM system 102 may provide automation enabled provisioning and business management systems (e.g., sales systems, billing systems, etc.). The INAM system 102 may be supported by a cloud-based architecture and provide micro-service processing. The INAM system 102 may provide an asset inventory and lifecycle management system for assets that are too large to manually manage in a level of granularity for global deployment. For example, IPv4 inventory numbers total over 100 million (M), and IPv6 inventory numbers, corresponding to a number of assigned IPv6 addresses, total over 26 nonillion ($26 \times 10^{21}$). IPv6 inventory numbers to be managed are expected to increase along with assignment of new IPv6 addresses.

IPv4 uses a 32-bit address space, which provides 4,294,967,296 ($1 \times 2^{32}$) unique addresses. However, all IPv4 addresses are not available for assignment. For example, the Internet Assigned Numbers Authority (IANA) and the Internet Engineering Task Force (IETF) have reserved large IP blocks of IPv4 addresses for special purposes, such as multi-cast traffic and use by private networks. The universe of assignable IPv4 addresses have already been exhausted. IPv6 addresses use a 128-bit address, theoretically allowing $1 \times 2^{128}$ (approximately $3.4 \times 10^{38}$) addresses. There is anticipated explosive growth in the use of IP addresses, through reclamation of IPv4 and IPv6 addresses and assignment of new IPv6 addresses, due to expansion of current systems (e.g., 5G wireless systems, wireline-terrestrial systems, etc.) and adoption of emerging systems (e.g., Intelligent Edge Network (IEN), Internet of Things (IoT), etc.).

As shown in FIG. 1A, the example implementation 100 may include a client device 104 (e.g., a desktop computer, server terminal, etc.) operated by a user (e.g., a network administrator) to communicate with the INAM system 102 to configure and manage network devices, according to some embodiments. The INAM system 102 may include a dashboard 106, a user interface (UI) 108 including UI component libraries, modules 110 providing micro services, and an INAM database 112, which may be a server database including a machine learning (ML) model 114. The example implementation 100 may include INAM resources 116 that may be selectively accessed by the modules 110 to execute tasks associated with the modules 110. In some embodiments, the INAM resources 116 may be included as resources within the INAM system 102. In some embodiments, the INAM resources 116 may be external resources to the INAM system 102 that are configured to communicate with and/or respond to the modules 110 of the INAM system 102. In some embodiments, the UI 108 may communicate with the modules 110 and the UI 108 may communicate with the INAM resources 116 through the modules 110. The UI 108 may communicate with wireline resources 118 and wireless resources 120, which may be administered and/or co-administered by respective users through client devices.

According to some embodiments, the INAM resources 116 may include a management server 124, a cloud platform server 126, an RPA engine 127, a Domain Name System (DNS) server 128, a Dynamic Host Configuration Protocol (DHCP) server 130, a Route Origination Authorization (ROA) server 131, an IP gateway 132, a messaging bus server 134, and a server database 136 (e.g., including a data management platform such as a business support system (BSS) database and/or an operational support system (OSS) database). In some embodiments, the modules 110 may access the INAM resources 116 through the management server 124.

According to some embodiments, the INAM resources 116 may include the cloud platform server 126 to configure the INAM system 102 as a virtual appliance in a cloud computing environment. In some embodiments, each of the modules 110 may be provided in a software container platform by the cloud platform server 126. As set forth in greater detail below, the software container platform may include one or more containers corresponding to each of the modules 110. Each of the modules 110 may be scaled within the container platform according to a scaling model. Scaling models include: a scale up model (e.g., vertical scaling), where the each of the modules 110 corresponds to a container that may be increased in resources in response to a task; a scale out model (e.g., horizontal scaling), where each of the modules 110 corresponds to a container of fixed unit size, and multiple containers are spawned in response to a divisible task; or a dynamically scaled up and scaled out model, where each of the modules 110 corresponds to a container that may be dynamically increased in resources in response to a task and multiple containers are spawned in response to divisible tasks. In an example, an identified block of IP assets (e.g., IP addresses or IP blocks) may comprise 20 assets grouped in a single container by one of the modules 110 through the cloud platform server 126. During processing of the assets, such as during an audit, the 20 assets may be discovered and the single container may be scaled up within the container platform to include resources corresponding to the 20 discovered IP assets. In another example, an identified block of IP assets may comprise or be discovered to comprise 2 million IP assets grouped in a single container by one of the modules 110 through the cloud platform server 126. During processing, the identified block of IP assets may be divided into a plurality of sub-blocks and the single container may be scaled out to spawn multiple containers, with each container corresponding to each of the plurality of sub-blocks. During subsequent processing and in an example, each spawned container may scale up or scale out to respond to tasks associated with each sub-block. For example, a spawned container may scale up to include resources corresponding to each IP address of a sub-block, or a spawned container may scale out to provide a separate container for each IP block included within a sub-block. Scaling models also include baseline scaling, width scaling, depth scaling, resolution scaling, compound scaling, and other scaling models. According to various examples, a scaling model may be selected through the client device 104 or may be dynamically selected by the INAM system 102 in response to attributes associated with a task. According to another example, a scaling model may be selected by the ML model 114 during execution of a dynamic workflow, as set forth in greater detail below.

According to some embodiments, the INAM resources 116 may include the RPA engine 127 configured as computer software (e.g., a "robot" or "bot"). In some embodiments, the RPA engine 127 may be directed by the INAM system 102 to emulate and integrate the actions of a human interacting with the client device 104. In some embodiments, the RPA engine 127 may be a component of a service orchestration engine (SOE) operating on a device, such as a server, that may be in operable communication with the INAM system 102. In some embodiments, the RPA engine 127 may be configured as a virtual appliance in a cloud computing environment by the cloud platform server 126. In some embodiments, the RPA engine 127 may be part of a system and/or platform to access and/or manage a data management platform in the server database 136. The RPA engine 127 may enable a user, through the client device 104, to perform a function and/or operation involving data of the INAM system 102 and/or other platform, such as the wireline resources 118 and/or the wireless resources 120. The RPA engine 127 may use AI (e.g., machine learning, deep learning, and/or other learning) to provide the UI 108.

According to some embodiments, the RPA engine 127 may be configured as a virtual assistant to control a display of the client device 104. When configured as a virtual assistant, the RPA engine 127 may provide a conversation service (e.g., natural language processing (NLP)) to perform a function and/or an operation, as described herein. For example, the RPA engine 127 may identify a function and/or an operation to be performed, and perform the function and/or operation (or cause the operation to be performed) in association with human-like characteristics of the function and/or operation. The RPA engine 127 may be configured to identify elements of the UI 108, to provide navigation of the UI 108, and/or to perform an associated operation. Additionally, or alternatively, the RPA engine 127 may selectively configure the UI 108 (e.g., as a chat bot) to obtain additional and/or supplemental information from the user.

According to some embodiments, the RPA engine 127 may present one or more electronic actions derived from predictions of the ML model 114 for selection and/or confirmation by a user through the client device 104. The ML model 114 may record user selections and/or may associate recorded user selections corresponding to a particular user. The ML model 114 may then prompt a user to automatically execute the one or more electronic actions through the RPA engine 127. For example, the INAM system 102 may receive predictions from the ML model 114 indicating one or more pools of IP blocks corresponding to an IP block owner to be audited. The INAM system 102 may then present an electronic action for selection and/or confirmation by a user through the client device 104 to audit a first pool of IP blocks corresponding to the IP block owner. Upon receiving the selection and/or confirmation, the RPA engine 127 may prompt a user through the client device 104 to automatically execute one or more electronic actions to audit other pools of IP blocks corresponding to the IP block owner. Additionally, and/or alternatively, other electronic actions, set forth in greater detail below, may be presented for selection and/or confirmation through the RPA engine 127.

According to some embodiments, the RPA engine 127 may cause an operation (and/or cause an operation to be performed) that accesses a data management platform in the server database 136. In an example, the RPA engine 127 may access the data management platform through the UI 108 to enter received information (e.g., updated IP block owner information associated with a plurality of IP blocks corresponding to a previous IP block owner) as if the information were manually entered by a human agent. In another example, the RPA engine 127 may cause navigation through the UI 108 to access the data management platform based on characteristics of the received user information and enter corresponding user information within designated fields of the UI 108 to perform the operation. Upon entry of the user information, the data management platform in the server database 136 may then update a data structure of the data management platform to include the updated information.

According to some embodiments, the RPA engine 127 may provide electronic actions (e.g., resulting from predictions by the ML model 114) for selection and/or confirmation, which correspond to previous behavior of a particular user associated with a function and/or operation. According to some embodiments the RPA engine 127 may provide and/or execute different operations automatically, such as cascading operations associated with one or more audits and/or operations of a dynamic workflow, which may improve speed, improve efficiency, and/or conserve computing resources (e.g., processor resources, memory resources, database resources, etc.). Examples described herein may increase capacities of human agents that are to perform redundant and/or duplicative tasks, such as responding to and/or updating received information from other services, other users, themselves, and/or other electronic actions generated as a result of machine learning by the ML model 114.

According to some embodiments, the INAM resources 116 may include the DNS server 128 to manage and/or translate a domain name hierarchy and IP addresses. In some embodiments, the DNS server 128 may be internal to the INAM system 102 and may manage domain names and IP addresses corresponding to an IP address owner stored in the server database 136. In some embodiments, the DNS server 128 may be external to the INAM system 102. In some embodiments, the DNS server 128 may be accessed by the INAM system 102 to conduct a validation test associated with a selected IP block. The validation test may be performed in response to a generated electronic action by the INAM system 102 to audit a pool of IP blocks including the selected IP block. To conduct the validation test of the selected IP block, the INAM system 102 may receive, from the server database 136, a domain name associated with the selected IP block and an IP block attribute, such as an IP block owner attribute, corresponding to the selected IP block. In some embodiments, the DNS server 128 may include a WHOIS database that may be polled, for the selected IP block, with the received domain name. The INAM system 102 may then receive, from the WHOIS database, central registry information and/or registrar information corresponding to the received domain name, including the domain name itself, an entity providing registration services for the domain name, domain status, nameservers associated with the domain, create/expire dates for the domain, and/or registered owner information. The INAM system 102 may compare, for the selected IP block, the registered owner information with the received IP block owner attribute and generate a validation status based on the comparison of the registered owner information and the received IP block owner attribute. In some embodiments, the validation status may indicate that the registered owner information from the WHOIS database does not match the received IP block owner attribute, and the INAM system 102 may then register a WHOIS entry in the WHOIS database corresponding to the received IP block owner attribute.

According to some embodiments, the INAM resources 116 may include the DHCP server 130 to manage IP settings for devices on a local network, e.g., by assigning IP addresses to the devices automatically and/or dynamically. In some embodiments, the DHCP server 130 may be accessed by the INAM system 102 to conduct a validation test associated with a selected IP block and/or a pool of IP blocks. The validation test may be performed in response to a generated electronic action by the INAM system 102 to audit the pool of IP blocks including the selected IP block. To conduct the audit of the pool of IP blocks, the INAM system 102 may identify each IP address associated with the pool of IP blocks. The INAM system 102 may perform a validation test associated with each identified IP address to obtain a corresponding first validation status. For example, the INAM system 102 may send a DHCP broadcast query to the DHCP server 130 for each identified IP address and receive corresponding configuration parameters from the DHCP server 130 indicating that the identified IP address may be unassigned to a device. The INAM system 102 may group each identified IP address into a set of unassigned IP addresses based on each corresponding first validation status and analyze the set of unassigned IP addresses to determine contiguous IP blocks of unassigned IP addresses. The INAM system 102 may assign unassigned status information to each contiguous IP block of unassigned IP addresses indicating that all corresponding IP addresses are unassigned. The INAM system 102 may then register, in the server database 136, each contiguous IP block of unassigned IP addresses as an audited IP block with corresponding validation status information including the unassigned status information. In some embodiments, as set forth in greater detail below, the INAM system 102 may perform IP block analysis on the audited IP blocks using dynamic workflows to compare validation status information of the audited IP blocks against trends corresponding to an IP block owner and provide a forecast of future needs for IP blocks by the IP block owner.

In some embodiments, the DHCP server 130 may be accessed by the INAM system 102 to conduct a second validation test associated with each identified IP address. The second validation test may be performed, based on the first validation status, to obtain a second validation status associated with each identified IP address in the pool of IP blocks. For example, to conduct the second validation test, the INAM system 102 may compare, for each identified IP address, a second configuration parameter received from the DHCP server 130, such as an associated default gateway, with a corresponding attribute retrieved from the server database 136. In some embodiments, the second validation test may be conducted automatically by the INAM system 102 upon completion of the first validation test. In some embodiments, the DHCP server 130 may be accessed by the INAM system 102 to conduct a third validation test associated with each identified IP address. The third validation test may be performed, based on the first validation status and the second validation status, to obtain a third validation status associated with each identified IP address in the pool of IP blocks. For example, to conduct the third validation test, the INAM system 102 may compare, for each identified IP address, a third configuration parameter received from the DHCP server 130, such as an associated domain name with a corresponding attribute retrieved from the server database 136. In some embodiments, the INAM system 102 may update the historical IP block information in the server database 136 for the selected IP block with validation status information based on the first validation status, the second validation status, and the third validation status.

According to some embodiments, the INAM resources 116 may include the ROA server 131 to return a route origin authorization (ROA) in response to a query. In some embodiments, the ROA server 131 may be internal to the INAM system 102 and return ROAs corresponding to an IP address owner. In some embodiments, the ROA server 131 may be external to the INAM system 102. In some embodiments, the ROAs may be returned in response to queries and may state which autonomous system (AS) may be authorized to originate a particular IP address prefix or set of IP address prefixes. For example, a particular IP address prefix may correspond to an IP block and a set of IP address prefixes may correspond to a pool of IP blocks. In some embodiments, upon return of an ROA for a certain combination of an origin AS and an IP address prefix, validation status information associated with a corresponding IP block may be included in the returned ROA. The validation status information may include an ROA name, an AS number (ASN), a validity date range, and/or one or more IP Addresses (along with a CIDR block designation). The validation status information may include a Resource Public Key Infrastructure (RPKI) announcement returned by the ROA server 131. For example, the ROA server 131 may be polled by the INAM system 102 for a selected IP block during an audit, and an RPKI announcement may be returned by the ROA server 131 as validation status information indicating that the selected IP block is valid, invalid, or unknown. In some embodiments, the RPKI announcement may be associated with the ROA returned by the ROA server 131. In some embodiments, the ROA server 131 may be accessed by the INAM system 102 to conduct a validation test associated with a selected IP block. The validation test may be performed in response to a generated electronic action by the INAM system 102 to audit the selected IP block. To perform the validation test, the INAM system 102 may poll the ROA server 131 with information corresponding to the selected IP block and receive a return ROA and/or an RPKI announcement as validation status information corresponding to the selected IP block. The INAM system 102 may then update historical IP block information in the server database 136 for the selected IP block with the validation status information.

According to some embodiments, the INAM resources 116 may include the IP gateway 132 (e.g., a routing device) to serve as an access point for communicating network traffic to a network external to the INAM system 102. The IP gateway 132 may include a routing table that specifies which interface may be used for transmission and which router on the network may be responsible for forwarding network traffic to a specific set of addresses. In some embodiments, the IP gateway 132 may be accessed by the INAM system 102 to conduct a validation test associated with a selected IP block. The validation test may be performed in response to a generated electronic action by the INAM system 102 to audit a pool of IP blocks including the selected IP block. To conduct the audit of the selected IP block, the INAM system 102 may receive, from the server database 136, an IP address owner attribute corresponding to the selected IP block. The INAM system 102 may identify each IP address associated with the selected IP block and poll the routing table in the IP gateway 132 for each identified IP address. The INAM system 102 may receive, from the IP gateway 132, a route statement corresponding to each polled IP address, the route statement including polled IP address owner information. The INAM system 102 may then compare, for each identified IP address, the polled IP address owner information with the received IP address owner attribute and generate a corresponding validation status based on the comparison. The INAM system 102 may then update historical IP block information in the server database 136 for the selected IP block with the validation status. In some embodiments, the INAM system 102 may determine, from the received route statement for each polled IP address, whether each polled IP address has an associated route configured to communicate information, and when the associated route is not configured to communicate information, build a new route for each polled IP address.

According to some embodiments, the server database 136 may store data associated with a data management platform such as a BSS database and/or an OSS database. The OSS database may include computer systems used by a communications service provider to manage a network (e.g., a communications network). The OSS database may support management functions and/or operations associated with a network, such as network inventory, service provisioning, network configuration and/or fault management. The OSS database may store historical IP block information associated with each of a plurality of IP blocks. The historical IP block information may include IP block size information, IP block type information, and IP block owner information such as an IP owner attribute identifying an owner of a corresponding IP block. According to some embodiments, the BSS database may include user components that a communications network service provider may use to manage and/or interface with user facing business operations. According to various example embodiments, the server database 136 may be configured as separate databases supporting the BSS and the OSS, or may include a plurality of other databases, such as databases associated with a data management platform. Other arrangements and/or configurations of the server database 136 are within the scope of the present disclosure.

According to some embodiments, the management server 124 may manage communication between the INAM resources 116 and the modules 110, the wireline resources 118, and the wireless resources 120. The messaging bus server 134 of the INAM resources 116 may communicate directly with the INAM subnet module to provide subnetting of IP blocks. In some embodiments, the ML model 114 may communicate directly with the server database 136. For example, the ML model 114 may communicate historical IP block information with the server database 136 associated with a plurality of IP blocks to be audited. The ML model 114 may receive historical IP block information corresponding to an IP block owner. In some embodiments, the ML model 114 may receive input from the client device 104 corresponding to the IP block owner. In some embodiments, the ML model 114 may select an IP block owner as part of periodic background auditing of IP blocks. As set forth in greater detail below, the INAM system 102 may train the ML model 114 based on historical IP block information stored in the server database 136 and may receive predictions from the trained ML model 114 indicating a pool of IP blocks to be audited. The INAM system 102 may generate an electronic action, based on the received predictions, to audit the pool of IP blocks to obtain validation status information for each IP block of the pool of IP blocks, and update the historical IP block information in the server database 136 and/or the INAM database 112 with the validation status information for each IP block of the pool of IP blocks.

According to some embodiments, the wireline resources 118 may include a number of resource elements, such as: virtual network services (VNS), which may be a bundle of combined network services and functions in a single executable package; a fiber to the premise (FTTP) provisioning platform for voice, data, video, etc. that may manage assignable inventory, provisioning and activation of FTTP network elements; a workforce management (WFM) platform that may manage tickets associated with network deployment; a wirelines subnet manager (SNM) that may manage wireline IP blocks; a broadband inventory manager (BIS) that may manage broadband wireline IP inventory; a base network controller (BNC) that may gather and/or stream telemetry from network elements; an enhanced traffic management (ETM) service (ETMS) that may prioritize traffic and may assign classes of IP service; an IP security monitor (IPSM) that may manage security associated with wireline IP service; a video data distribution system (VDDS) that may distribute video data, such as special even pay-per-view content; a network intelligence resource; and an IP learning resource. The wireless resources 120 may include a plurality of vendor specific resources (e.g., resources specific to wireless handset manufacturers for provisioning IP addresses). Other arrangements and/or configurations of the wireline resources 118 and/or the wireless resources 120 are within the scope of the present disclosure.

According to some embodiments, the modules 110 may comprise a network discovery module, a report module, a search module, an IP address management module, a subnet module, a subnet Internet Routing Registry (IRR) module, an IANA/SWIP module, and a Role Based Access Control (RBAC) module. The subnet IRR module communicates with and manages IP blocks and IP addresses with an external RIR 122. According to some embodiments, the INAM system 102 may integrate with domain name servers (e.g., through the IP address management module) and network devices (e.g., through the network discovery module) to provide remote provisioning. For example, upon installation of network devices in a user premises by a utility company, the network devices may be remotely provisioned with IP addresses as a unified IP block associated with the utility company as an IP block owner. Other arrangements and/or configurations of the modules 110 of the INAM system 102 are within the scope of the present disclosure.

According to some embodiments, the subnet IRR module may allocate and/or register IP addresses and/or IP blocks with the external RIR 122. In some embodiments, the subnet IRR module may be accessed by the INAM system 102 to conduct a validation test associated with a selected IP block. The validation test may be performed in response to a generated electronic action by the INAM system 102 to audit a pool of IP blocks including the selected IP block. To conduct the audit of the selected IP block, the INAM system 102 may identify each IP address associated with the selected IP block and receive, from the server database 136, an IP address owner attribute associated with each identified IP address. The INAM system 102 may poll an IRR database in the external RIR 122, for each identified IP address, with a public autonomous system number (ASN) corresponding to the IP address owner attribute. The INAM system 102 may receive, from the IRR database, IRR owner information for each identified IP address corresponding to the polled public ASN. The INAM system 102 may compare, for each identified IP address, the received IRR owner information with the IP address owner attribute, and generate a validation status based on the comparison of the received IRR owner information and the IP address owner attribute.

According to some embodiments, the IP address management module may access IP address information and/or IP block information. The IP address management module may communicate with the DNS server 128, which translates domain names to IP addresses, and may communicate with the DHCP server 130, which may assign a unique address to a network device (e.g., a network element). IP addresses may be accessed/managed with Transmission Control Protocol (TCP) and Internet Protocol (IP) (TCP/IP), which may identify a network device for communication and may supply other network configuration parameters. According to some embodiments, a search module of the INAM system 102 may search the INAM database 112 through a role based access control (RBAC) module to obtain record search responses (e.g., legal requests, life and death responses, individual person searches, etc.) associated with an IP address. A report module of the INAM system 102 may configure the record search responses into a corresponding report, which may be output to a user through the client device 104.

Figure 1B:
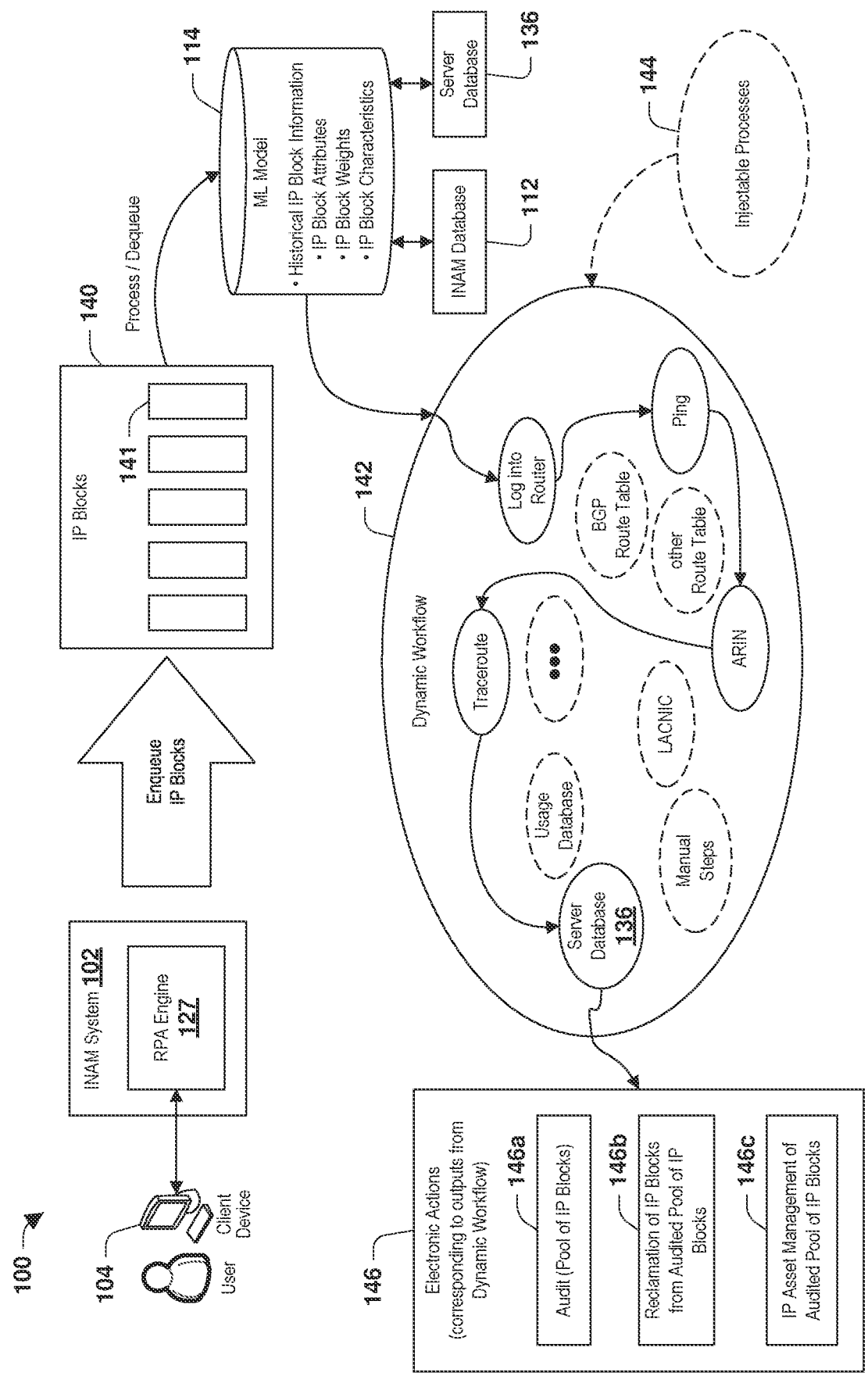

As shown in FIG. 1B, an example implementation 100 may include the INAM system 102 to enqueue IP blocks 140 for processing by the ML model 114, according to some embodiments. In some embodiments, the INAM system 102 may enqueue the IP blocks 140, including an IP block 141, with the RPA engine 127. In some embodiments, the ML model 114 may be provided in operable communicate with the INAM database 112 and/or the server database 136 and may obtain historical IP block information corresponding to the IP blocks 140. The historical IP block information may include IP block attributes, such as an IP block owner attribute, an IP block size attribute, and an IP block type attribute. In some embodiments, the ML model 114 may assign IP block weights to the IP block attributes. In some embodiments, the IP block weights may be initially assigned to the IP block attributes by the INAM system 102 in response to user input through the client device. In some embodiments, the IP block weights may be received from the INAM database 112 and/or the server database 136, such as a result from a prior audit of the IP blocks 140. In some embodiments, the IP block weights may be derived by the ML model 114 based upon a comparison of a plurality of IP blocks sharing a common attribute, e.g., an IP block owner attribute, enqueueing status of an IP block, etc., set forth in greater detail below. In some embodiments, the example implementation 100 may provide automated IP asset management and auditing through a dynamic workflow 142 (e.g., using ML/AI). Injectable processes 144 may be inserted into the dynamic workflow 142, and may be manually configured and/or inserted through ML/AI.

According to some embodiments, the example implementation 100 may provide automated IP asset management by the INAM system 102 through background monitoring and auditing. In some embodiments, electronic actions 146 may be performed in association with the dynamic workflow 142. The electronic actions 146 may include an audit action 146a of a pool of IP blocks predicted by the ML model 114, a reclamation action 146b of IP blocks from an audited pool of IP blocks, or IP asset management action 146c of a pool of IP blocks. In some embodiments, the pool of IP blocks to be managed by the electronic actions 146 may share one or more common attributes and/or audit results, and/or may be presented to a user through the client device 104 for bulk processing. In an example, the audit action 146a may indicate that a subset of IP addresses of the pool of IP blocks share a common attribute indicating that a corresponding route is not configured to communicate information. In this case, for example, the dynamic workflow 142 may indicate an invalid route statement associated with a trace route, and a corresponding audit action 146a may be generated to build a route for the subset of IP addresses.

In an example, the reclamation action 146b may indicate that a subset of IP addresses of the pool of IP blocks share a common attribute indicating that the subset of IP addresses is unassigned. In this case, for example, the dynamic workflow 142 may indicate that an external RIR, a WHOIS database, and the server database 136 all confirm that the subset of IP addresses are unassigned, and a corresponding reclamation action 146b may be generated to assign unassigned status information to contiguous IP blocks of the subset of IP addresses. In an example, the pool of IP blocks to be managed may share a common attribute, such as an IP block owner attribute, to be changed. In this case, for example, the dynamic workflow 142 may designate that an ARIN external RIR, a WHOIS database, and the server database 136 are to be updated, and a corresponding IP asset management action 146c may be generated. Other IP asset management actions may include removing an assignment of an IP asset from the server database 136, creating an external record, creating an internal record, creating a trouble ticket, etc.

In some embodiments, the electronic actions may be performed contemporaneously with execution of the dynamic workflow 142. For example, an audit 146a may be performed contemporaneously while an IP block is being processed through the dynamic workflow 142 such that results of each audit operation are contemporaneously stored in the INAM database 112. In some embodiments, the electronic actions 146 may be structured as outputs to a user, such as through the client device 104, for final selection and/or authorization. In some embodiments, the electronic actions 146 may be configured for automatic execution, such as by the RPA engine 127 of the INAM system 102.

In some embodiments, a user may individually and/or in bulk authorize the electronic actions 146 through the RPA engine 127. In an example, a user may authorize full automation of the electronic actions 146 through the RPA engine 127 based upon recursive reviews of prior electronic actions 146. In another example, if a user authorized a type of electronic action a number of times (e.g., fifty, one hundred times, etc.) as determined by the ML model 114, the user may authorize full automation for the type of the electronic action through the RPA engine 127.

According to some example embodiments, the dynamic workflow 142 is chosen dynamically by the ML model 114 using ML algorithms based on the outcomes of other tasks. Attributes of a dataset associated with IP blocks may drive decision paths through the dynamic workflow 142 and result in corresponding electronic actions 146. In some embodiments, the ML model 114 may provide weighted process paths and the electronic actions 146 may be inferred from actions taken over time. According to some example embodiments, the injectable processes 144 may include new processes for IP asset management that can be injected by users (e.g., through the RPA engine 127). Based upon the injectable processes 144, the ML model 114 may be updated with the electronic actions 146 to provide supervised learning. Users can adjust the electronic actions 146 (e.g., by providing recommended weights to the ML model 114 through the client device 104) and configure the RPA engine 127 to engage or ignore specific tasks and/or workflow paths.

As shown in FIG. 1B and according to some embodiments, an arbitrary set of IP blocks (e.g., raw data) may be designated as the IP blocks 140 to be enqueued and applied for processing and eventual dequeuing with the ML model 114. In an example, the RPA engine 127 may enqueue the IP blocks 140 with a manual discovery heuristic. In another example, the RPA engine 127 may enqueue the IP blocks 140 with an auto-discovery heuristic implemented by the ML model 114 based upon a defined structure and authorization. In some embodiments, the ML model 114 may examine and process IP block attributes, IP block weights, and/or other IP block characteristics. The dynamic workflow 142 (i.e., a dynamic sequence) may be applied to the IP blocks 140 by the ML model 114 based upon the attributes, weights, and/or other IP block characteristics. In some embodiments, the dynamic workflow 142 may follow a process for each IP block based upon the attributes, weights, and/or characteristics. For example, the dynamic workflow 142 may, for each IP address in an IP block, log into a router, ping the IP address, access an RIR through ARIN, determine a traceroute, and then access the server database 136 to analyze and determine records associated with each IP address. Depending upon the IP block, the dynamic workflow 142 may determine a BGP route, access an RIR through LACNIC, determine usage by accessing a usage database, and/or determine a need for manual operations to further analyze the IP block. During execution of the dynamic workflow 142, weights (e.g., weighted functions) may be dynamically assigned to IP block attributes, and one or more ML models may be applied to the assigned weights.

In some embodiments, upon completion of the dynamic workflow 142, INAM system 102 may provide the electronic actions 146 as structured positive or negative audit functions. For example, the dynamic workflow 142 may change based upon the structured positive or negative audit functions. In some embodiments, multiple audits may be executed by the INAM system 102 to train the ML model 114. In some embodiments one or more of the multiple audits may follow different dynamic workflows, and different attributes corresponding to each of the dynamic workflows may be updated. Each of the different dynamic workflows may be presented for selection and/or confirmation by a user through the client device 104. In some embodiments, an injectable process 144 may be integrated into the dynamic workflow 142 and presented as an alternative electronic action for selection and/or confirmation by a user through the client device 104. In some embodiments, the injectable process 144 may include a user defined process and/or a previously defined process, and may be injected dynamically into the dynamic workflow 142.

In some embodiments, the INAM system 102 may receive, from the server database 136, historical IP block information associated with a plurality of IP blocks corresponding to an IP block owner. The historical IP block information may include, for each of the plurality of IP blocks, IP block size information and IP block type information. The INAM system 102 may train the ML model 114 based on the historical IP block information. The INAM system 102 may receive predictions from the trained machine learning model indicating a pool of IP blocks of the plurality of IP blocks to be audited. The INAM system 102 may generate one of the electronic actions 146, such as the audit action 146a based on the received predictions, to audit the pool of IP blocks to obtain validation status information for each IP block of the pool of IP blocks. The INAM system may then update the historical IP block information in the server database 136 with the validation status information for each IP block of the pool of IP blocks. In some embodiments, the INAM system 102 may cluster the pool IP blocks into sets of IP blocks, using the trained ML model 114, based on the historical IP block information, analyze the sets of IP blocks, using the trained machine learning model, to determine an order for auditing the sets of IP blocks, and automatically generate the audit action 146a to audit the sets of IP blocks in the determined order.

In some embodiments, the INAM system 102 may conduct a second or multiple audits. For example, the INAM system 102 may receive, from the server database 136, second historical IP block information associated with a second plurality of IP blocks corresponding to an IP block owner. The second historical IP block information may include, for each of the second plurality of IP blocks, IP block size information and IP block type information. The INAM system 102 may train the ML model 114 based on the second historical IP block information. The INAM system 102 may receive second predictions from the trained machine learning model indicating a second pool of IP blocks of the second plurality of IP blocks to be audited. The INAM system 102 may generate a second electronic action, such as the audit action 146a based on the received predictions, to audit the second pool of IP blocks to obtain second validation status information for each IP block of the second pool of IP blocks. The INAM system may then update the historical IP block information in the server database 136 with the second validation status information for each IP block of the second pool of IP blocks. Other arrangements and/or configurations of the INAM system 102, the ML model 114, the dynamic workflow 142, the injectable processes 144 and/or the electronic actions 146 are within the scope of the present disclosure.

As shown in FIG. 1C, an example implementation 100 includes the INAM system 102 configured to process an IPv4 address 148 in dotted-decimal notation. The IPv4 address 148 may include an IPv4 address format of 4 octets, which may be expressed as a quad-dotted IP address or a binary notation. The IPv4 address 148 may be accessed with a subnet mask, also known as a classless inter-domain routing (CIDR) prefix. The example of FIG. 1C illustrates the IPv4 address 148 with a CIDR of /24.

As shown in FIG. 1D, an example implementation 100 includes the INAM system 102 configured to process an IPv4 address using an IPv4 conversion table 150. The IPv4 conversion table 150 illustrates a number of usable IP addresses associated with CIDR prefixes /1 to /32. The IPv4 conversion table 150 may be used by the INAM system 102 to divide (e.g., subnet) an IP block into a number of smaller IP blocks or to join a number of IP blocks into a single IP block. The IPv4 conversion table 150 indicates a number of classful networks associated with each CIDR prefix.

Figure 1E:
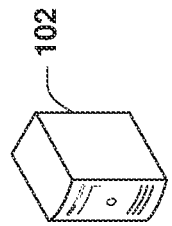

As shown in FIG. 1E, an example implementation 100 includes the INAM system 102 configured to process IPv4 addresses in a reserved private IPv4 network range 152. The address ranges set forth in the reserved private IPv4 network range 152 are internal to a network domain, such as a network domain of the INAM system 102 or a network domain external to the INAM system 102. According to an example, the INAM system 102 may process IP blocks within the reserved private IPv4 network range 152 to provide the electronic actions 146.

Figure 1F:
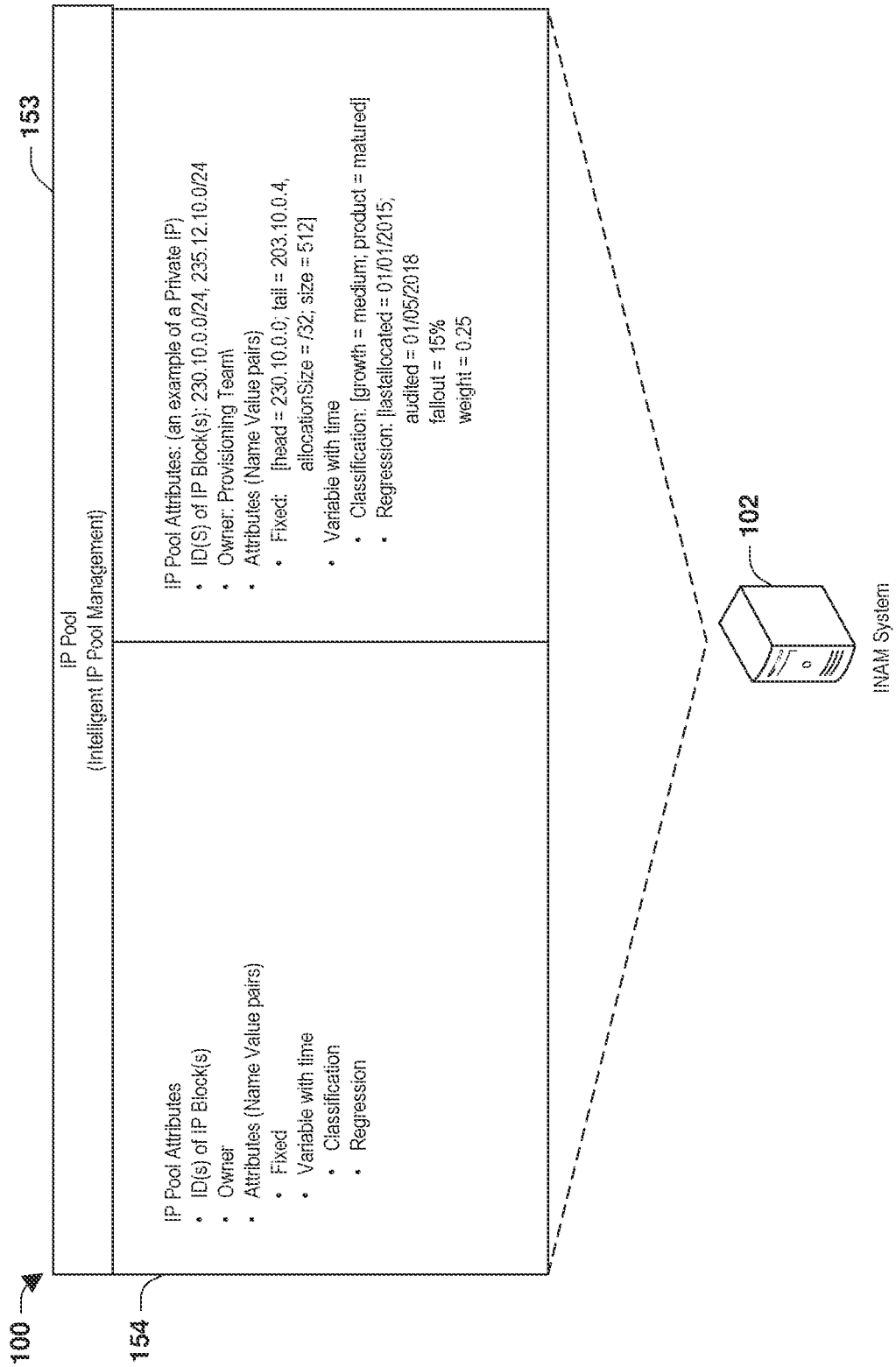

As shown in FIG. 1F, an example implementation 100 includes the INAM system 102 for intelligent pool management of an IP pool 153 including IP pool attributes 154, according to some example embodiments. The IP pool attributes 154 may include fixed attributes and variable attributes. The INAM system 102 provides intelligent IP pool management (e.g., management of one or more IP block pools or subnet IP block pools). In some embodiments, the IP pool 153 may include a single IP block or a plurality of IP blocks associated with an entity, such as an owner, or a resource. For example, if one IP address is being used in the IP pool 153, the one IP address may be reassigned to free up the associated IP pool. According to some embodiments, algorithms, such as from the ML model 114, may update the attributes (e.g., weights associated with IP block attributes) periodically using supervised or unsupervised learning. One or more ML models may be applied through dynamic workflow 142 to process the IP pool 153 using the IP pool attributes 154 (e.g., metadata). For example, a scanning model may perform an audit analysis and a utilization analysis. Executed workflows, such as the dynamic workflows 142, may be determined and stored as IP pool attributes (e.g., metadata). According to an example embodiment, the IP pool 153 may comprise a group of IP blocks, where each group may include a plurality of attributes stored with a corresponding weight as a name value pair. The IP pool 153 may be associated with one or more attributes (IDs), such an attribute identifying a group of IP blocks, an owner attribute identifying an owner, and/or other attributes configured as name/value pairs. An example of attributes of IDs of IP Blocks includes: 230.10.0.0/24 (first ID attribute), 235.12.10.0/24 (second ID attribute). An example of an owner attribute includes: Provisioning Team\. Another example of an owner attribute includes: Provisioning Team\First Member, where "\First Member" designates a first member of the Provisioning Team as the owner. According to some example embodiments, the IP address owner attribute may be compared with the registered owner attribute and the IP block owner attribute to determine an IP address owner status associated with the identified IP address. According to some example embodiments, the IP pool owner attribute may designate a number of owners. The number of owners may be grouped horizontally at a same level, grouped vertically in hierarchical levels, and/or grouped as a combination of both. Examples of the IP pool attributes 154 as fixed attributes, configured as name/value pairs, include: head, corresponding to a head IP address for an IP block (e.g., value=230.10.0.0); tail, corresponding to a tail IP address for an IP block (e.g., value=203.10.0.4); allocationSize, corresponding to an allocation size associated with an owner (e.g., value=/32 (CIDR prefix)); and size, corresponding to a size of the IP block (e.g., value=512). Examples of the IP pool attributes 154 as variable attributes, configured as name/value pairs, include: classification, corresponding to classification of the IP block pool for growth of the IP block space and type of product (e.g., growth value=medium; product value=matured); regression, corresponding to processing of the group of IP blocks with the trained ML model 114 (e.g., lastallocated value=01/01/2015, audited value=01/05/2018, fallout value=15%, and weight=0.25). Other arrangements and/or configurations of the INAM system 102 including the IP pool attributes 154 as fixed or variable attributes are within the scope of the present disclosure.

FIG. 1G illustrates an example implementation 100 of the INAM system 102 for intelligent IP block management of the IP block 141 including IP block attributes 156, according to some example embodiments. The IP block attributes 156 may include fixed attributes and variable attributes. Examples of the IP block attributes 156, configured as name/value pairs, include: owner, corresponding to an owner of the IP block; type, corresponding to a type of IP block being fixed or variable; head, corresponding to a starting IP address of the IP block; tail, corresponding to an ending address of the IP block; allocation size, corresponding to an allocated size associated with the IP block; classification growth, corresponding to prospective growth of the IP block (e.g., high, medium, or low); classification product, corresponding to a product type associated with the IP block (e.g., new, intermediate, or mature); last allocated, corresponding to a date when the IP block was last allocated; audited, corresponding to a date when the IP block was last audited; fallout, corresponding to a percent change from the audit record; name, corresponding to a name of the IP block (e.g., a CIDR block name); assignment size, corresponding to a percent of IP address assigned; and a user defined attribute, corresponding to a user defined variable (e.g., IP blocks that have been assigned greater than 365 days). IP pool attributes 156 illustrated in FIG. 1G further include example attributes for a 24-bit IP block, a 20-bit IP block, and a 16-bit IP block. Other arrangements and/or configurations of the IP pool attributes 154 are within the scope of the present disclosure.

Figure 1H:
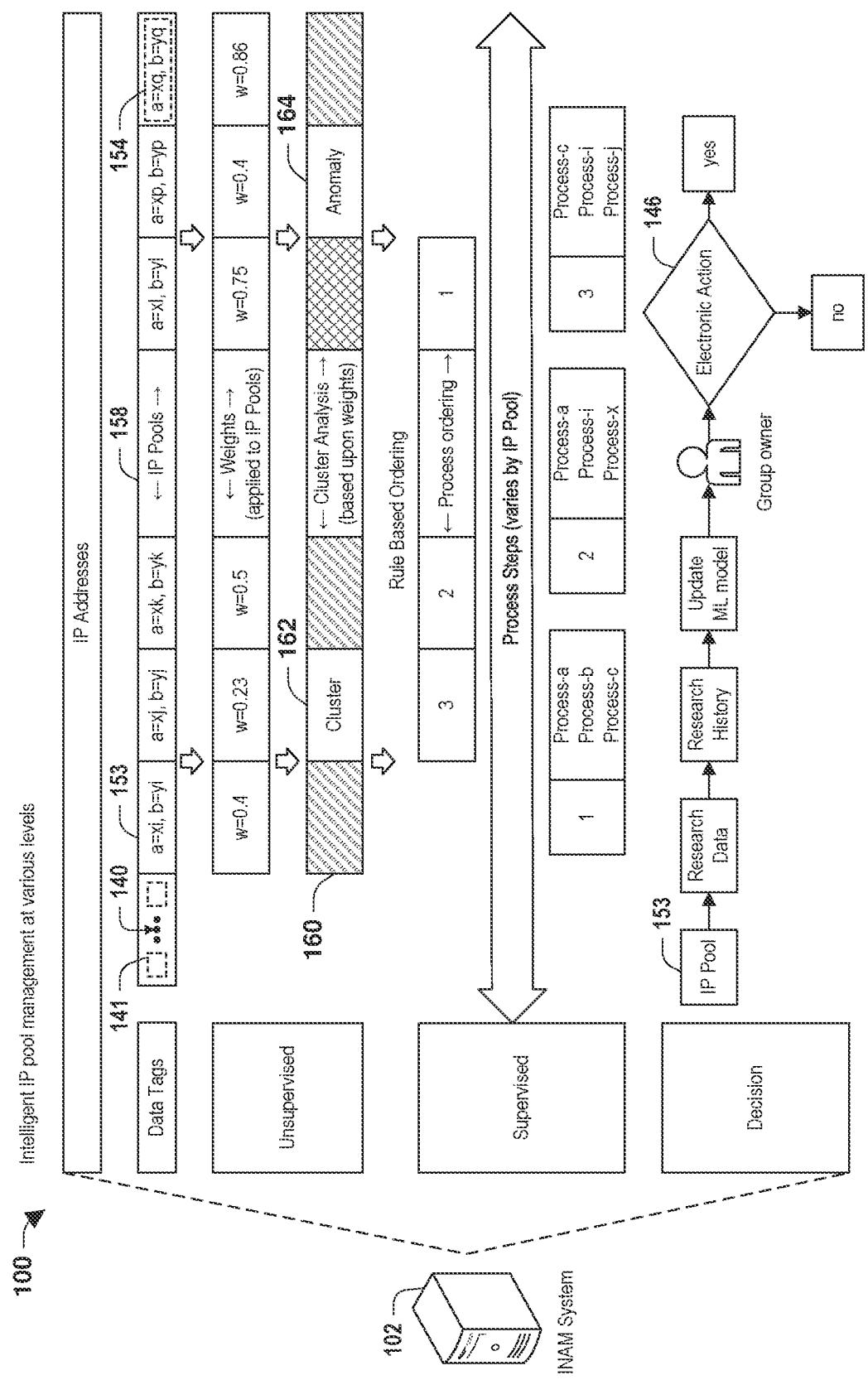
Figure 11:
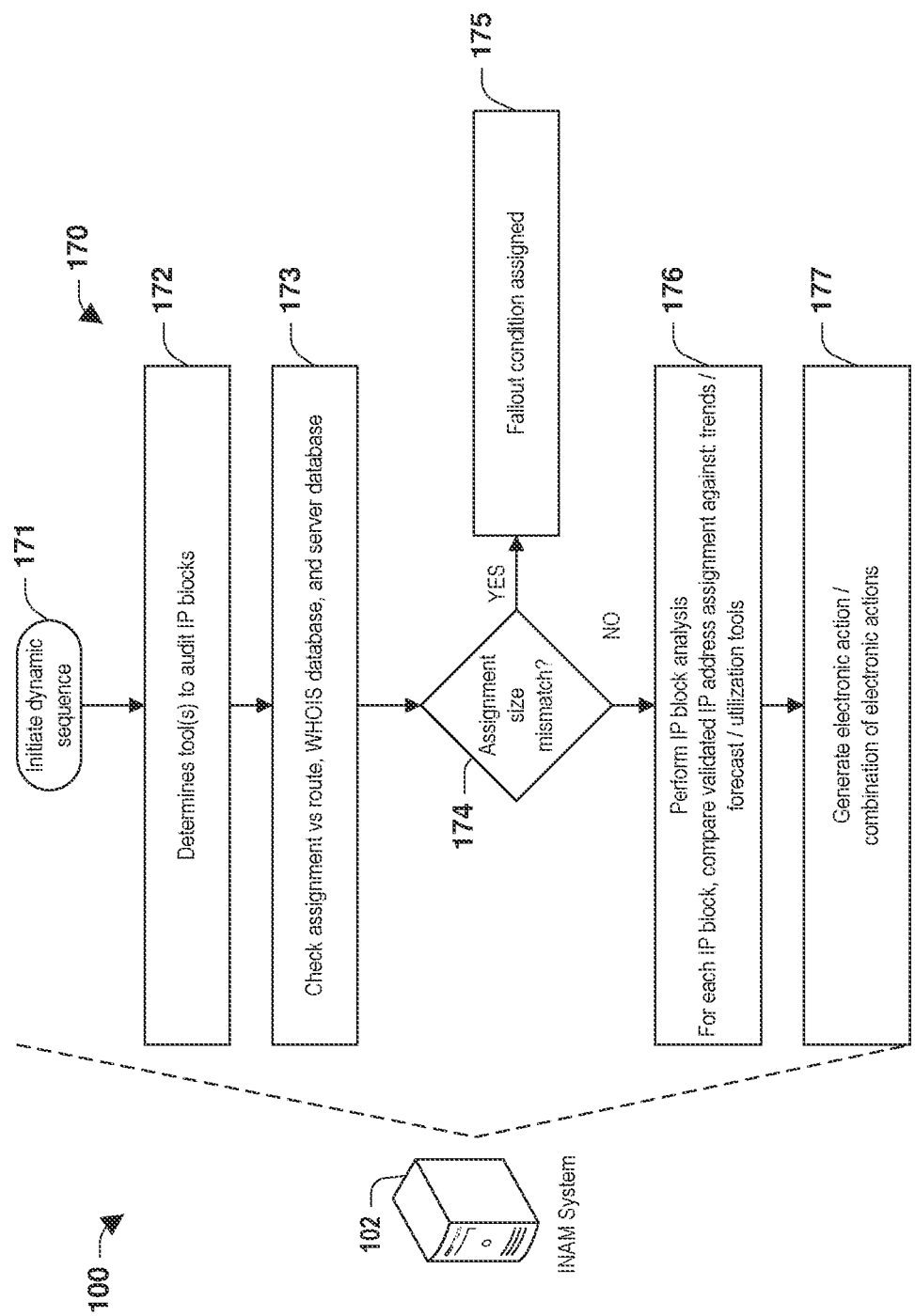

FIG. 1H illustrates an example implementation 100 of the INAM system 102 with weighting and/or clustering of the IP pools 158 as datasets, according to various example embodiments. According to an example, each of the IP pools 158, such as the IP pool 153, includes the IP blocks 140. According to an example, each of the IP pools 158 includes the IP pool attributes 154. According to an example, the INAM system 102 provides supervised and/or unsupervised weighting and/or clustering of the IP pools 158 and/or the IP blocks 140. In some embodiments, an unsupervised algorithm may be provided for weight clustering of the IP blocks 140 and/or the IP pools 158 into clusters 160, such as a cluster 162. For example, the cluster 162 may be assigned a classification=growth (e.g., corresponding to a growth network such as a growing wireless or wireline network) and may receive a weight of 1.0 because corresponding IP addresses within the cluster 162 may not be available for reclamation. In another example, the cluster 162 may be assigned a legacy network classification=low and may receive a weight of 0.1 because a number of IP addresses may be available for reclamation. The IP blocks 140 may be clustered based upon weights. According to some embodiments, a supervised algorithm may be provided for weight clustering. For example, processes (e.g., a, b, and c) may be assigned to a clustered IP block group for processing based upon weights. In a supervised process, weighted IP blocks and/or weighted IP pools may be ordered for processing. At the conclusion of the unsupervised and/or supervised learning, the INAM system 102 may update the ML model 114 and communicate predictions as an electronic action 146 to a group owner. In some embodiments, the electronic action 146 is presented to the group owner through the RPA engine 127 as a recommended action for selection and/or confirmation by way of the client device 104. In an example, the ML model 114 may communicate predictions as the electronic action 146 based on the historical IP block information and the updating of the ML model 114.

According to some embodiments, the group owner may correspond to a user illustrated in FIG. 1A, and may be internal or external. In an example, a group owner may correspond to an entity, such as a business unit or a team (e.g., a provisioning team), a team member, or another type of owner. In an example, the electronic action 146 may be a reassignment of an IP block to a different network/subnetwork. The electronic action 146 may be assigned by a group owner to be an automatic electronic action. For example, if all IP addresses in the cluster 162 are not being used (e.g., based upon unsupervised auto-discovery), an entirety of IP blocks and/or IP pools in the cluster 162 may be reassigned. In another example, if an IP block within the cluster 162 includes a combination of networks/subnetworks with one network/subnetwork indicating current use, the electronic action 146 may be to maintain assignment of used IP addresses with the IP block and reassign remaining IP addresses to a new IP block. The new IP block may then be assigned to another group owner. In an example, the cluster analysis may determine an order for processing (e.g., auditing) the IP blocks and/or IP pools. Because IP addresses associated with IP blocks and/or IP pools may exceed hundreds of thousands or millions, process ordering of the IP blocks and/or IP pools may use substantial resources. For example, if the IP block 141 has 16,382 usable IP addresses (corresponding to a CIDR prefix length of /18) and has an assignment size indicating 95% assigned, the IP block 141 may receive a lower order for processing. In another example, if the IP block 141 has 8,388,606 usable IP addresses (corresponding to a CIDR prefix length of /9) and has an assignment size indicating 50% assigned, the IP block 141 may receive a higher order for processing. Other arrangements and/or configurations of prioritizing the IP blocks 140 for processing by the INAM system 102 are within the scope of the present disclosure.

According to some embodiments, unsupervised learning may use IP pool metadata and operational data. During cluster analysis, datasets of the IP pools 158 having similar data patterns may be categorized into clusters. A user and/or the ML model 114 may assign a label to an identified cluster. An IP pool may be identified as an anomaly 164 based upon the metadata or operational data. In an example, the anomaly 164 may be an IP pool with metadata and/or operational data that may not be shared with another IP pool. In another example, the anomaly 164 may be an IP pool that varies in metadata or operational data that varies significantly from other IP pools according to the applied weights. In an example, an IP pool with the anomaly 164 may be tagged for investigation as an electronic action. In an example, an investigation may be assigned to the ML model 114 automatically for investigation. In another example, a user may be prompted with the electronic action 146 of an investigation and a user may select investigation for execution by the RPA engine 127. Attributes may be correlated to indicate a positive correlation or a negative correlation. A positive correlation may be provided when one attribute moves upwardly with respect to another attribute and a negative correlation may be provided when one attribute moves downwardly with respect to another attribute. In an example, the cluster 162 may include IP blocks with similar positive correlation of attributes, similar negative correlation of attributes, or another correlation of attributes.

According to some embodiments, supervised learning may be provided for identified IP pools using the dynamic workflows 142. The ML model 114 may be used to identify a sequence of operations corresponding to the attributes of the identified IP pool. For example, IP assets of the identified IP pool may include a similar attribute indicating an ARIN RIR. In this case, the electronic action 146 may include a ping to the ARIN RIR to confirm registration of one or more IP addresses (e.g., all IP addresses) in an associated IP block. In another example, the IP pool may include a similar attribute indicating an LACNIC RIR. The electronic action 146 may include a ping to the LACNIC RIR to confirm registration of one or more IP addresses (e.g., all IP addresses) in an associated IP block. In the above examples, a ping to the ARIN RIR or the LACNIC RIR may indicate an unassociated IP address. In another example, if a number of IP addresses in a cluster of IP blocks greater than a threshold value are not associated with an RIR, a label (e.g., a new attribute) may be applied to the cluster of IP blocks and the injectable process 144 may be introduced into the dynamic workflow 142. The label may be applied automatically in an unsupervised process or a user may be prompted to apply a label (e.g., a user defined attribute). In some embodiments, the injectable process 144 may include registration of the IP addresses with the external RIR 122. In another example, one or more IP addresses in the cluster 162 (e.g., all IP addresses) may indicate registration with the external RIR 122, but are not being used. In this example, an injectable process may include de-registration of the IP blocks in the cluster 162 with the RIR. Actions of the dynamic workflow 142, whether automatic or user authorized, may be registered in a log (e.g., with one or more corresponding attributes) for auditing and subsequent analysis.

According to some example embodiments, the dynamic workflow 142 may be used for IP address assignment. The dynamic workflow 142 may provide logical coordination of IP blocks between routers, route tables (e.g., a BGP route table), ping, traceroute, etc. The dynamic workflow 142 may dynamically access the server database 136, such as a BSS/OSS datastore, a global customer hierarchy (GCH) datastore, a unified service profile (USP) datastore for customers using predetermined services, and a sales system datastore. The GCH datastore may include a GCH ID (e.g., an attribute) associated with a customer. The USP may identify the type of product (e.g., an attribute) associated with one or more customer attributes, such as a customer ID, a customer activation date, and a customer status (e.g., currently connected or disconnected). The sales system datastore may include private IP (PIP) orders for order processing. The dynamic workflow 142 may access an ownership database providing IP blocks associated with the server database 136. The ownership database may include an IP Point of Contact (IPPOC) database that correlates and tracks one or more attributes corresponding to IP addresses, individual owners, and individual devices. The ownership database may include a security database including attributes indicating a security violation, which may be internal or external. The dynamic workflow 142 may access an external service such as an RIR, an IRR, a customer service portal for customer self-management of an IP pool (e.g., a user or client device associated with the wireline resources 118 and/or the wireless resources 120), or a geolocation filter identifying a physical location of a device (e.g., a pole, a wireless tower, etc.). Other arrangements and/or configurations of the dynamic workflow 142 are within the scope of the present disclosure.

In some example implementations, the ML model 114 may include one or more of an exploratory factor analysis model, a confirmatory factor analysis model, a principal component analysis model, a k-means clustering model, a least absolute shrinkage and selection operator (Lasso)

regression analysis model, an artificial neural network model, non-linear regression model, decision tree model, a fuzzy logic model, and/or another model.

In some example implementations, the exploratory factor analysis model may include a statistical model used to uncover an underlying structure of a relatively large set of variables. For example, the exploratory factor analysis model may perform a factor analysis technique to identify underlying relationships between measured variables. Measured variables may include any one of several attributes, such as the attributes described herein. Measured variables may be stored, observed, measured, and/or generated (e.g., as part of an IP block audit). The exploratory factor analysis model may be based on a common factor model, within which a function of common factors, unique factors, and errors of measurement expresses measured variables. Common factors may influence two or more measured variables, while each unique factor may influence one measured variable and does not explain correlations among measured variables.

In some example implementations, the confirmatory factor analysis model may include a form of factor analysis that may be used to test whether measures of a construct are consistent with a preliminary conception of a nature of the construct. An objective of the confirmatory factor analysis model may be to test whether data fits a hypothesized measurement model that may be based on theory and/or previous analytic research.

In some example implementations, the principal component analysis model may include a statistical procedure that uses an orthogonal transformation to convert a set of observations of possibly correlated variables into a set of values of linearly uncorrelated variables called principal components. A number of distinct principal components may be equal to a smaller of a number of original variables or a number of observations minus one. The orthogonal transformation may be defined in such a way that a first principal component has a largest possible variance, and each succeeding component in turn has a highest variance possible under a constraint that it may be orthogonal to preceding components. Resulting vectors may include an uncorrelated orthogonal basis set.

In some example implementations, the k-means clustering model may be applied to partition (n) observations into (k) clusters in which each observation belongs to a cluster with a nearest mean, serving as a prototype of the cluster, which results in a partitioning of a data space into Voronoi cells. The k-means clustering model may utilize efficient heuristic methods that converge quickly to a local optimum.

In some example implementations, the Lasso regression analysis model may include a regression analysis model that performs both variable selection and regularization in order to enhance a prediction accuracy and interpretability of a statistical model that the Lasso regression analysis model produces. For example, the Lasso regression analysis model may include a shrinkage and selection model for linear regression, and may seek to obtain a subset of predictors that minimizes prediction error for a quantitative response variable. In some example implementations, the Lasso regression analysis model may minimize a prediction error by imposing a constraint on model parameters that cause regression coefficients for some variables to shrink towards zero. Variables with a regression coefficient equal to zero after the shrinkage process may be excluded from the model, while variables with non-zero regression coefficient variables may be most strongly associated with the quantitative response variable.

In some example implementations, the artificial neural network model may use an artificial neural network to perform machine learning. An artificial neural network may utilize a collection of connected units or nodes, also known as artificial neurons. Each connection between artificial neurons may transmit a signal from one artificial neuron to another artificial neuron. An artificial neuron that receives the signal may process the signal and then provide a signal to artificial neurons connected to the artificial neuron. In some artificial neural network implementations, the signal at a connection between artificial neurons may be a real number, and the output of each artificial neuron may be calculated by a non-linear function of the sum of its inputs. Artificial neurons and connections may have a weight that adjusts as learning proceeds. The weight may increase or decrease the strength of the signal at a connection. An artificial neuron may have a threshold such that the artificial neuron only sends a signal if the aggregate signal satisfies the threshold. Artificial neurons may be organized in layers, and different layers may perform different kinds of transformations on their inputs.

In some example implementations, the non-linear regression model may apply non-linear regression analysis to perform machine learning. Non-linear regression may be a form of regression analysis in which observational data are modeled by a function which may be a non-linear combination of the model parameters and depends on one or more independent variables. The observational data may be fitted by successive approximations. The non-linear function may be, for example, an exponential function, a logarithmic function, a trigonometric function, a power function, a Gaussian function, and/or another function.

In some example implementations, the decision tree model may use a decision tree data structure to perform machine learning. A decision tree data structure may classify a population into branch-like segments that form an inverted tree with a root node, internal nodes, and leaf nodes. For example, the decision tree learning model may use a decision tree as a predictive model to map observations about an item (represented in the branches of the tree data structure) to conclusions about the item target value (represented in the leaves of the tree data structure). Building a decision tree may include partitioning the data set into subsets, shortening of branches of the tree, and selecting a tree (e.g., the smallest tree) that fits the data. In some example implementations, a decision tree model may be a classification tree (where the target variable can take a discrete set of values) in which leaves represent class labels and branches represent conjunctions of features that lead to those class labels. In some example implementations a decision tree model may be a regression tree (e.g., where the target variable can take continuous values, such as real numbers).

In some example implementations, the fuzzy logic model may apply fuzzy logic to perform machine learning. Fuzzy logic may be a form of many-valued logic in which the truth values of variables may be any real number between zero and one. Fuzzy logic may be employed to represent the concept of partial truth, where the truth value may range between completely true and completely false, as opposed to Boolean logic, where the truth values of variables may only be the integer values zero or one, representing only absolute truth or absolute falseness. The fuzzy logic model may include variations of existing machine learning techniques in which fuzzy logic may be applied. Other arrangements, configurations, and/or implementations of the ML model 114 are within the scope of the present disclosure.

FIG. 1I illustrates an example implementation 100 of the INAM system 102 and a flow chart 170 corresponding to an example dynamic workflow 142, according to some example embodiments. The example dynamic workflow may be associated with an IP block, an IP pool, or a cluster of IP blocks. In an example, the flow chart 170 may be associated with a dynamic workflow for auditing an IP block. At 171, a dynamic sequence is initiated. In an example, the dynamic sequence may be initiated by a user in response to an owner inquiry (e.g., based upon an owner inquiry associated with an IP block or a cluster of IP blocks). In another example, the dynamic sequence may be initiated based upon analysis of an attribute by the ML model 114 associated with a group of IP addresses (e.g., a user defined group of IP addresses identified with a user defined attribute). At 172, the virtual assistant determines a tool or tools that may be used to audit the IP block. For example, the tools to conduct the audit may include: the INAM database 112, which may be a server database to store IP address assignments from multiple databases and systems; and a logical activity tool, such as routers, route tables, ping tools, traceroute tools, and a BGP route table, to determine if an IP assignment for an IP block may be assigned as live in the INAM database 112 and assigned as live externally (e.g., in a route table of an RIR). The tools may also include business relationship tools, such as GCH, USP, and/or a sales system datastore indicating validity of IP assignments. The tools may also include ownership tools, such as IPPOC, IPSM, ETMS, VDDS, etc., indicating an entity currently using the IP block, the IP block location, and a purpose associated with the IP block.

As shown in FIG. 1I at 173, the INAM system 102 may access a network address translation (NAT) database and may verify for each IP address that a route may be associated with the IP address. The INAM system 102 may then trace the route and may verify that the IP address may be valid and/or operable. In an example of an IP address in a private IP network without external IP access, the INAM system 102 may verify the route in an internal network by tracing a reserved IP loopback route (e.g., the reserved private IPv4 network range 152). In another example, the INAM system 102 may trace an IP address in the range of 127.0.0.0-127.255.255.255, which may be reserved for loopback and private network use. In an example of an IP address in a private IP network with external access privileges, the INAM system 102 may access an IP configuration database (e.g., using INAM resources 116) to determine the listed IPv4 Address, the subnet mask, and the default gateway address. The INAM system 102 may then ping a designated external IP address and may trace the route to verify that the IP address may be valid. The INAM system 102 may then access the WHOIS database for each IP address in the IP block and may verify that the owner assignment matches the WHOIS record. The INAM system 102 may then access the server database 136 (e.g., a BSS/OSS database) and may verify that the owner assignment matches a corresponding record in the server database 136.

As shown in FIG. 1I at 208, the INAM system 102 may verify that the size of the IP addresses matches the size indicated in a record of the server database 136. If an assignment size mismatch is detected, a fallout condition (e.g., an attribute) may be assigned at 175 to the IP block or the cluster of IP blocks for further investigation of the corresponding record in the server database 136. If the assignment size is valid, an IP block analysis may be performed at 176. For the IP block analysis at 176, the dynamic workflow 142 may compare validated IP address assignments against trends and provides a forecast using utilization tools. For example, a trend may examine attributes associated with metrics, also known as "actuals." Examples of metric attributes include: last 30 days; growth, shrinkage, uptrend associated with IP block type, and downtrend associated with IP block type. A forecast may then be provided based upon the determined trend, e.g., a supply forecast for IP blocks associated with the group owner for the next 30 days.

As shown in FIG. 1I at 177, the INAM system 102 may provide an electronic action or a combination of electronic actions for individual IP addresses, IP blocks, IP pools, and/or clusters of IP blocks. In an example of IP addresses without a route, a build route electronic action may be provided. In an example of IP addresses without an associated WHOIS entry, a create WHOIS entry electronic action may be provided. In an example of currently used IP addresses without an associated record in the server database 136, an update support system record electronic action may be provided. In an example of non-used IP addresses without an associated record in the server database 136, an IP address reclamation electronic action may be provided. In an example of an IP block or cluster of IP blocks, if a trend or a forecast indicates a need for additional resources, an electronic action may be provided with an offer to submit a request for additional resources. In an example where a number of unused IP addresses is greater than a threshold (e.g., an attribute), based upon a weighted statistical analysis of the unused IP addresses, an overstock condition may exist, and a return to repository electronic action may be provided for a number of unused IP addresses. In an example where all IP addresses are properly assigned, routed, entered in the WHOIS database, and the weighted statistical analysis of the unused IP addresses matches current trends and forecasts, a no action electronic recommendation may be provided. According to some embodiments, the dynamic workflow 142 may form a cascade confirmation decision matrix according to Table 1, as follows:

TABLE 1

| Assignment | Route | WHOIS | Support System Database | Electronic Recommendation |
|---|---|---|---|---|
| Y | Y | Y | Y | No Action |
| Y | N | Y | Y | Build Route |
| Y | Y | N | Y | Create WHOIS Entry |
| Y | Y | Y | N | Update Support System Database |

Other arrangements and/or configurations of electronic actions are within the scope of the present disclosure.

Figure 1J:
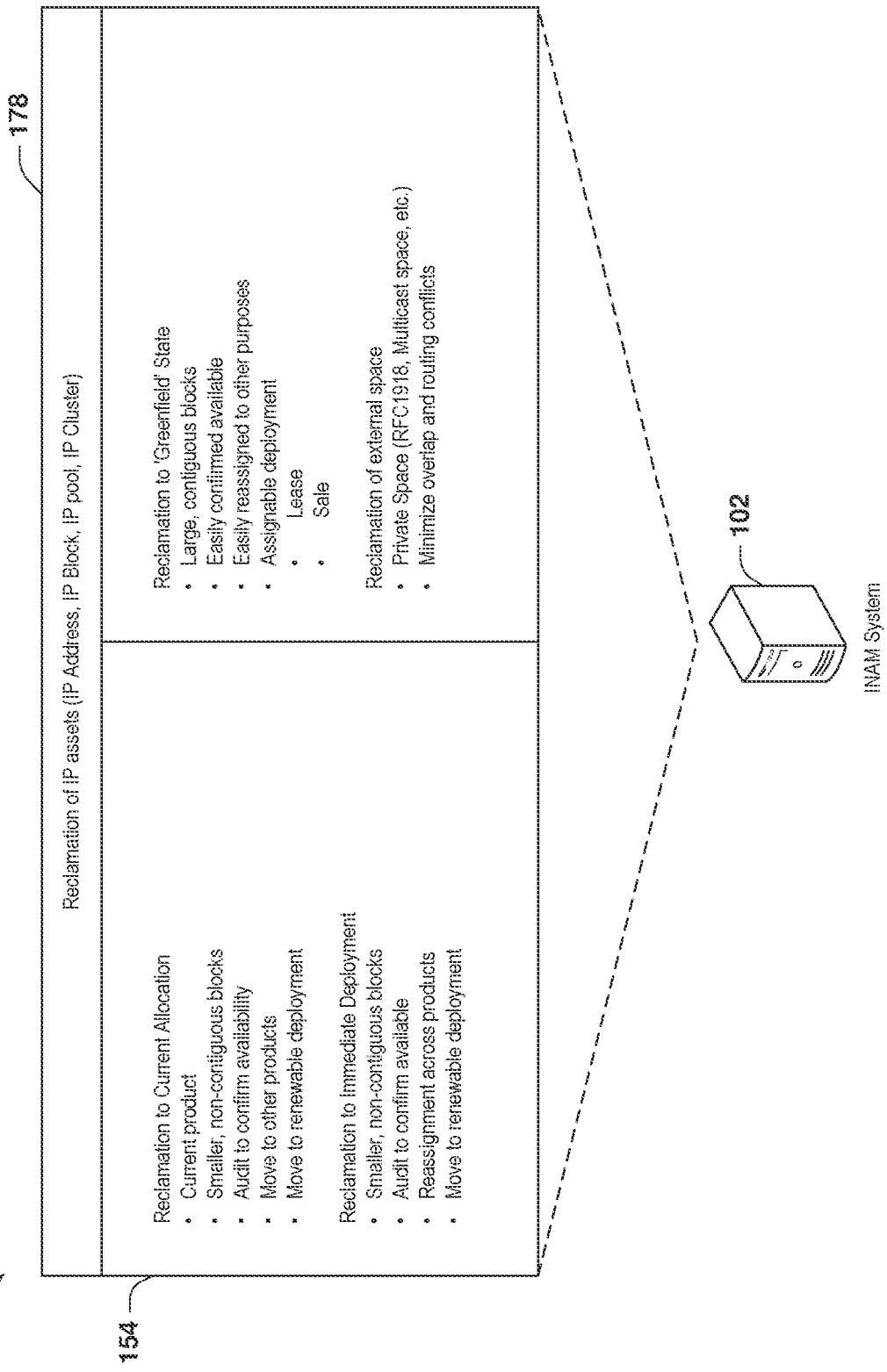

FIG. 1J illustrates an example implementation 100 of the INAM system 102 and a reclamation 178 of IP assets, according to some example embodiments. In some embodiments, the reclamation 178 may be provided for IP assets, such as IP addresses, IP blocks, IP pools, and/or IP clusters. According to some embodiments, the reclamation 178 may form part of the dynamic workflow 142 and/or may be configured by the ML model 114, selected by the RPA engine 127, and/or selected by a user through the client device 104. The reclamation 178 may include workflows related to reclamation to current allocation, reclamation to immediate deployment, reclamation to 'greenfield' state, and/or reclamation of external space. According to an example, a reclamation to current allocation may be used with attributes corresponding to: a current product; smaller, non-contiguous blocks; audit to confirm availability; move to other products; or move to renewable deployment. According to various examples, a reclaimed IP asset may be assigned in a current allocation to a current product associated with an owner. A reclaimed IP asset may be assigned in a current allocation with smaller, non-contiguous blocks associated with a single owner. A reclaimed IP asset in a current allocation may be triggered for an audit to confirm availability. A reclaimed IP asset in a current allocation may be moved to another product and/or product type. A reclaimed IP asset in a current allocation asset may be moved to a renewable deployment, such as a lease, a short-term lease, and/or a single use lease (e.g., where the IP asset may be continually re-deployed as a single use lease). In an example, if an IP pool has reclaimable IP assets, the IP assets may be freed up and re-used locally, whether fragmented or non-fragmented. For example, millions of IP addresses may be associated with a legacy product (e.g., DSL), but remain fragmented across various non-integrated IP blocks. Owner assignments and/or re-assignments may be sequential, and re-assignments and/or deletions may create holes within IP blocks. Original assignments may be static and may not be available for re-assignment. Reclamation of IP addresses associated with the legacy product may be reclaimed as IP blocks and may be further deployed as IP blocks. In an example, a CIDR of /24 is a smallest IP block that may be routed in a public internet. The CIDR /24 IP block may be part of a CIDR IP block /16 assigned to a product, with a CIDR /28s IP block assigned to a single owner, imposing restrictions on a CIDR IP block /17 within the CIDR IP block /16. In this example, reclaiming of CIDR IP block /17 as a "large clean block" (e.g., in the Greenfield state), may trigger an electronic action and/or analysis by the ML model 114 for reconfiguration and/or subnetting.

According to some embodiments, the reclamation 178 may include workflows related to reclamation to immediate deployment. A designation of immediate deployment provides for immediate reassignment across products, renewable deployment, and/or may be provided in combination with an audit. The reclamation 178 may include workflows related to reclamation to a 'Greenfield' state. The Greenfield state may be provided for unrestricted deployment of large, contiguous IP blocks with an assignable deployment, such as a lease and/or sale. The reclamation 178 may include workflows related to reclamation of an external space, such as through operation of by an external user and/or client device associated with the wireline resources 118 and/or the wireless resources 120. Other arrangements and/or configurations of the reclamation 178 for IP assets are within the scope of the present disclosure.

Figure 1K:
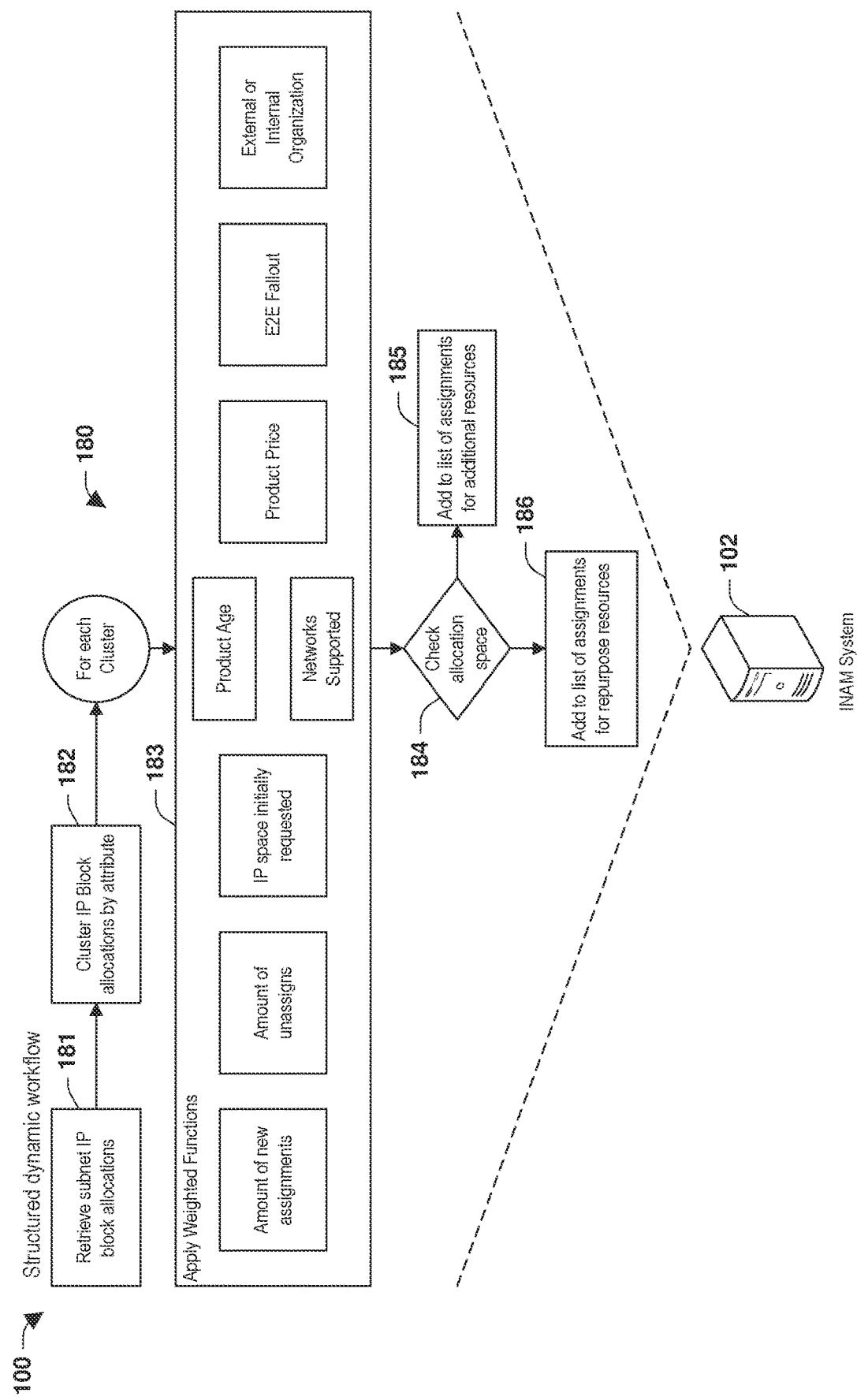

FIG. 1K illustrates an example implementation 100 of the INAM system 102 and a flow chart 180 corresponding to an example structured dynamic workflow of the dynamic workflow 142, according to some example embodiments. The example structured dynamic workflow may be associated with an IP block, an IP pool, and/or a cluster of IP blocks. According to some embodiments, the structured dynamic workflow of the flow chart 180 may be executed periodically for subnet defined IP blocks. In an example, the subnet defined IP blocks may be selected by the ML model 114. In another example, the subnet defined IP blocks may be selected by the RPA engine 127 and/or a user selection through the client device 104. According to an example embodiment, the flow chart 180 may be associated with a structured dynamic workflow for processing a cluster of IP blocks within a subnet IP block. At 181, IP blocks allocations (e.g., attributes associated with the IP blocks within the subnet IP block) for processing may be retrieved. For example, a dynamic sequence may be initiated. At 182, IP blocks may be clustered with reference to a cluster attribute, such as a name attribute of the IP blocks. In an example embodiment, the cluster attribute may be part of the structured dynamic workflow and may be selected by a user through the client device 104, and/or form part of an electronic action provided through the RPA engine 127. In an example embodiment, the cluster attribute forms part of an electronic action provided by the ML model 114. At 183, weighted functions corresponding to attributes of the IP blocks may be applied to the IP blocks, such as: amount of new assignments, amount of unassigns, IP space initially requested, product age, networks supported, product price, E2E fallout, external/internal organization, or other attributes. In an example embodiment, the weighted functions corresponding to attributes of the IP blocks may be determined and applied by the ML model 114. At 184, allocation space associated with the IP blocks may be determined. In an example, if the allocation space associated with the IP blocks is greater than a threshold amount (e.g., 95% occupied greater than a threshold of 75% occupied), then at 185 an electronic action may be made to add additional resources (e.g., to add additional IP blocks associated with the IP block owner). In an example, if the allocation space associated with the IP blocks indicates a number of IP addresses greater than a threshold amount (e.g., 80% unoccupied greater than a threshold of 60% unoccupied), then at 186 an electronic action may be made to repurpose resources (e.g., to initiate a reclamation for the unoccupied IP blocks). Other arrangements and/or configurations for a structured dynamic workflow, such as batch processing a cluster of IP blocks within a subnet IP block, are within the scope of the present disclosure.

Figure 1L:
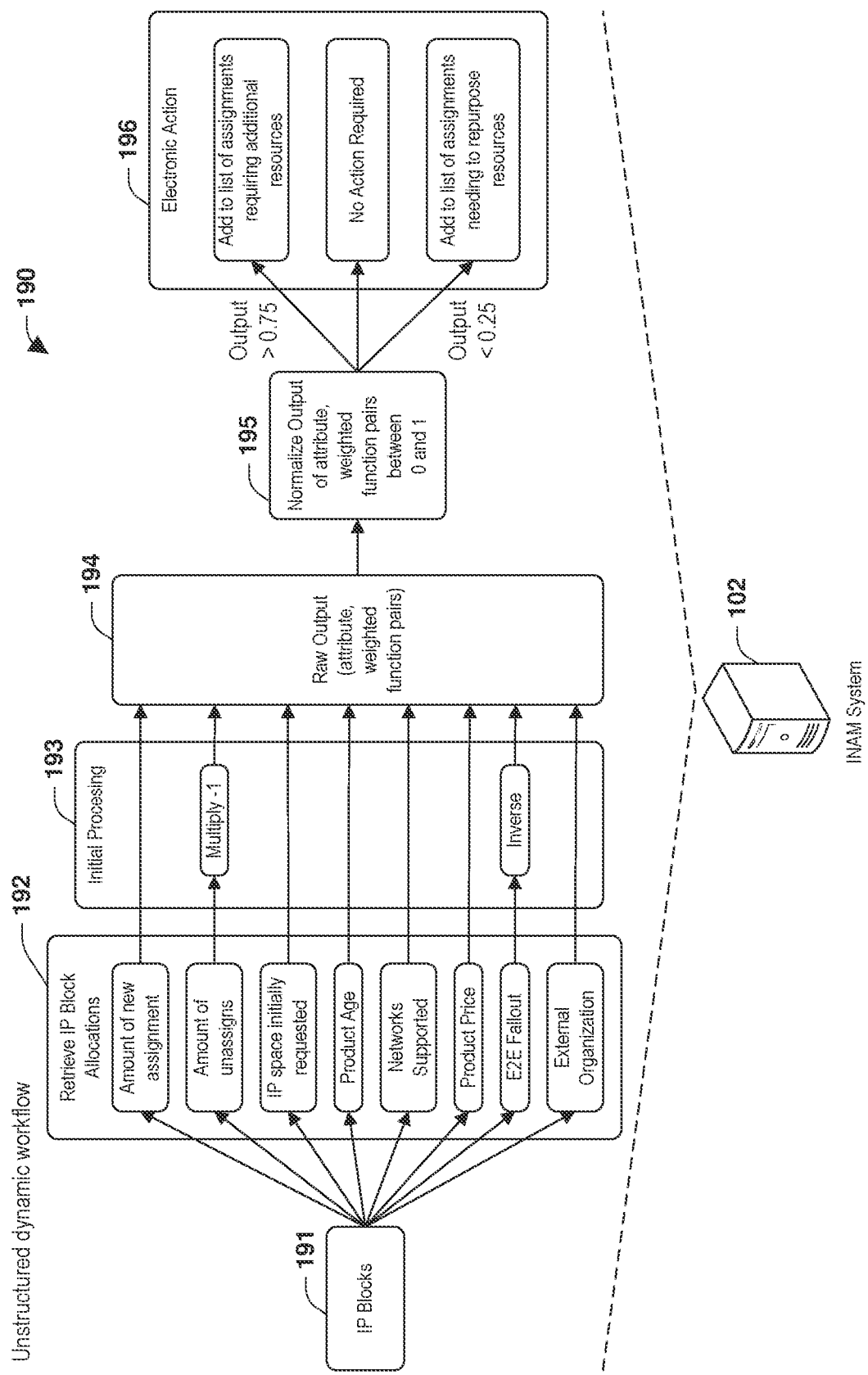

FIG. 1L illustrates an example implementation 100 of the INAM system 102 and a flow chart 190 corresponding to an example unstructured dynamic workflow of the dynamic workflow 142, according to some embodiments. The example unstructured dynamic workflow may be associated with an IP block, an IP pool, and/or a cluster of IP blocks. According to an example, the unstructured dynamic workflow of the flow chart 190 may be run periodically for IP blocks 191. The IP blocks 191 may be defined for analysis as a set associated with an attribute, such as an owner attribute, or the IP blocks 191 may be undefined for analysis, such as an inventory of all known IP blocks. In an example, the IP blocks 191 may be selected for analysis by the ML model 114. In another example, the IP blocks 191 may be selected by the RPA engine 127 and/or a user selection through the client device 104 (e.g., by setting an attribute by a user). At 192, IP block allocations (e.g., weighted functions associated with each IP block) for processing and/or analysis may be assigned to each corresponding attribute. In an example, the IP block allocations may be attribute, weighted function pairs associated with each IP block. IP block allocations, for each of the IP blocks, may correspond to: amount of new assignment, amount of unassigns, IP space initially requested, product age, networks supported, product price, E2E fallout, or designation of external organization. An example of an amount of new assignment may be that an example input shows that IP allocations for business internet have increased over the last year, increasing the value by x amount. An example of an amount of unassigns may be that a legacy product provides a surge in un-assignment, increasing a value associated with the legacy product. An example of an IP space initially requested may correspond to an IP space originally requested by an owner for a new product. An example of product age may be a number of years associated with existence of a product. Newer products may take higher priority, which may indicate a need for additional IP space. Older products are not likely to request new IP space and may have IP space that can be recycled. An example of product price may correspond to a price of the product. An example of E2E fallout may be a percentage of ordering and provisioning fallout vs successful orders with no issue. Products with a high fallout may see less demand for allocation of IP blocks. An example of external or internal organization may designate a business unit and/or organization that may not easily change from IPv4 to IPv6, and prompt an indication for greater allocation of IPv4 space for associated products (e.g., IDA). Other IP block allocations associated the IP blocks, such as the IP block allocations corresponding to the attributes set forth above, are within the scope of the present disclosure.

According to some embodiments, at 193, IP block allocations may be initially processed. In an example, for each IP block, a weighted function associated with an amount of unassigns may be multiplied by −1 to provide a negative number for further processing. In an example, for each IP block, a weighted function associated with E2E fallout may be inversed to provide an inverse number for further processing.

According to some embodiments, at 194, raw output of IP blocks may be defined and/or stored as a set for processing by the ML model 114. The raw output may have weighted functions that correspond to the associated attributes and may have a scale and/or format that also corresponds the associated attributes. For example, an attribute of classification growth may be designated as high, medium, or low, while an assignment size attribute may be designated as a percentage. At 195, attributes and weighted functions corresponding to the attributes are normalized between 0 and 1. For example, an attribute of classification growth of high/medium/low may be normalized to 0.75/0.5/0.25. For example, an attribute of assignment size designated as 75% may be normalized to 0.75. At 196 an electronic action may be generated to repurpose resources (e.g., to initiate a reclamation for unoccupied IP blocks). The electronic action, for example, may be to add to list of assignments requiring additional resources for a normalized output greater than a threshold of 0.75. The electronic action, for example, may be to take no action for a normalized output less than or equal to a threshold of 0.75 and greater than or equal to a threshold of 0.25. The electronic action, for example, may be to add to list of assignments needing to repurpose resources for a normalized output less than a threshold of 0.25. The thresholds may be changed, for example, by the ML model 114, the RPA engine 127, and/or a user designation through the client device 104. In an example, the ML model 114 may be updated and/or retrained in response to receiving the normalized output. Other arrangements and/or configurations for an unstructured dynamic workflow, such as obtaining and normalizing attribute, weighted function pairs, are within the scope of the present disclosure.

Figure 2:
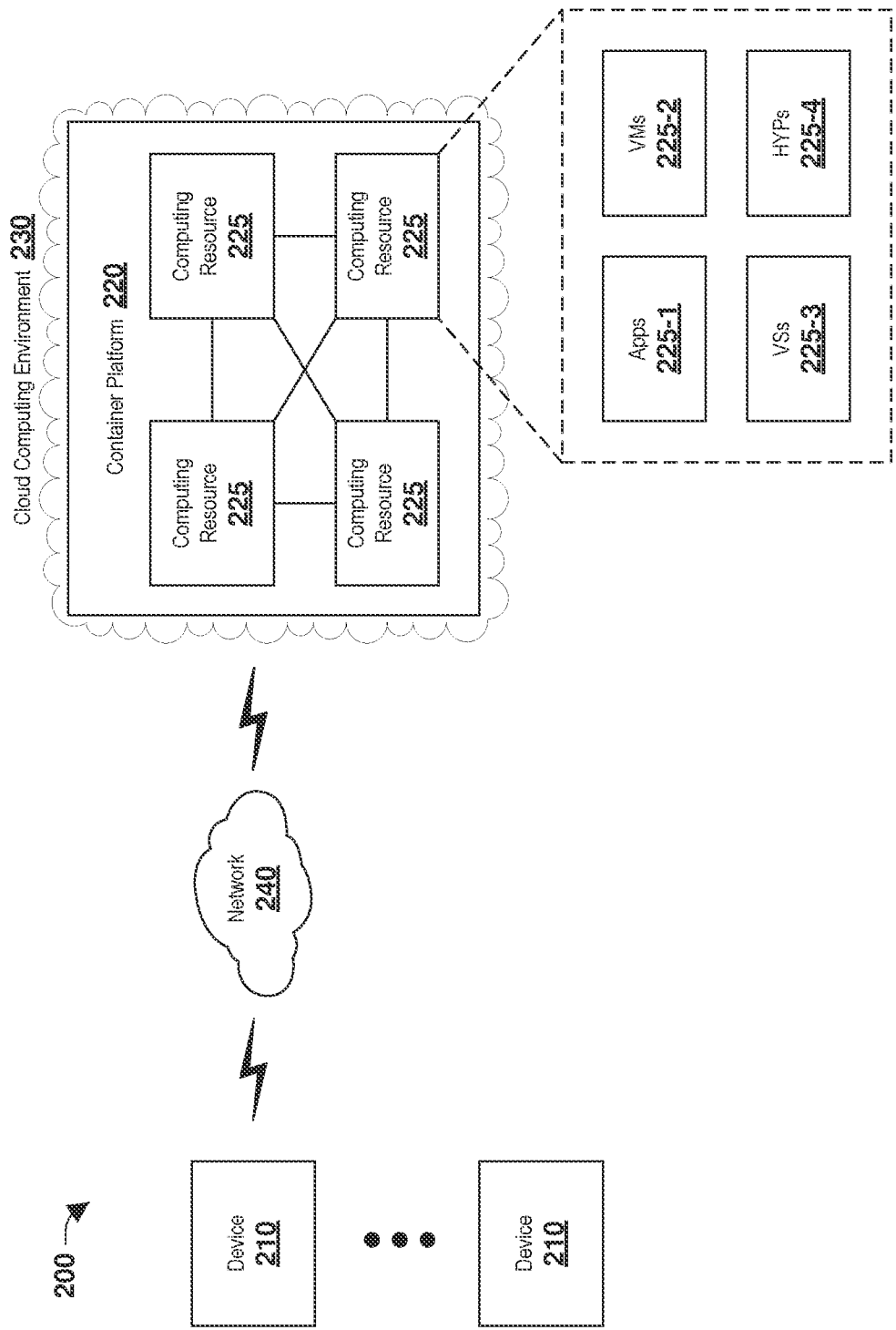
FIG. 2 is an illustration of an example environment in which systems and/or methods, described herein, may be implemented, according to some example embodiments.

FIG. 2 is an illustration of an example environment 200 in which systems and/or methods, described herein, may be implemented, according to some example embodiments. As shown in FIG. 2, the example environment 200 may include one or more devices 210 that access a cloud computing environment 230 by way of a network 240. The one or more devices 210 may interconnect via wired connections, wireless connections, or a combination of wired and wireless connections. In some embodiments, the one or more devices 210 may communicate with the container platform 220 in the cloud computing environment 230. According to some embodiments, the device 210 may correspond to the INAM system 102, a device associated with the INAM system 102 (e.g., the client device 104, a client device associated with the wireline resources 118, a client device associated with the wireless resources 120, etc.), and/or a device responding to and/or communicating with the INAM system 102 such as the RPA engine 127. According to some example embodiments, the container platform 220 may correspond to the INAM system 102 and/or a component of the INAM system 102 (e.g., the cloud platform server 126 of the INAM resources 116).

The device 210 may include one or more devices capable of receiving, generating, storing, processing, and/or providing information, such as information described herein. For example, the device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, the device 210 may receive information from and/or transmit information to the container platform 220. The device 210 may be referred to collectively as "devices 210" and individually as "the device 210."

In some example implementations, the container platform 220 may include one or more devices that utilize machine learning to determine data storage pruning parameters. In some implementations, the container platform 220 may be designed to be modular such that certain software components may be swapped in or out depending on a particular need. The container platform 220 may be reconfigured for different uses. In some implementations, the container platform 220 may receive information from and/or transmit information to one or more devices 210. In some implementations, the container platform 220 may be provided by the cloud platform server 126. In some implementations, the container platform 220 may be provided in the same cloud computing environment as the cloud computing with the containers or in a different cloud computing than the cloud computing environment with the containers.

In some example implementations, the container platform 220 may be hosted in the cloud computing environment 230. In some implementations, the container platform 220 may not be cloud-based such that the container platform 220 may be implemented outside of a cloud computing environment. In some implementations, the container platform 220 may be partially cloud-based.

In some example implementations, the cloud computing environment 230 may comprise an environment that hosts the container platform 220. The cloud computing environment 230 may provide computation, software, data access, storage, etc. services that do not involve end-user knowledge of a physical location and configuration of system(s) and/or device(s) that host the container platform 220. The cloud computing environment 230 may include a group of computing resources 225. The group of computing resources 225 may be referred to collectively as "computing resources 225" and individually as the "computing resource 225". In some implementations, each of the computing resources 225 corresponds to a container in the container platform 220. In some implementations, each of the computing resources 225 corresponds to more than one container in the container platform 220. In some implementations, the container platform 220 includes a container corresponding to more than one of the computing resources 225.

In some example implementations, the computing resource 225 may include one or more personal computers, workstation computers, server devices, or other types of computation and/or communication devices. In some implementations, the computing resource 225 may host the container platform 220. The cloud resources may include compute instances executing in the computing resource 225, storage devices provided in the computing resource 225, data transfer devices provided by the computing resource 225, etc. In some example implementations, the computing resource 225 may communicate with other computing resources 225 via wired connections, wireless connections, or a combination of wired and wireless connections.

In some example implementations, the computing resources 225 may include a group of cloud resources, such as one or more applications ("APPs") 225-1, one or more virtual machines ("VMs") 225-2, virtualized storage ("VSs") 225-3, one or more hypervisors ("HYPs") 225-4, and/or other cloud resources.

In some example implementations, the application 225-1 may include one or more software applications that may be provided to or accessed by the device 210. The application 225-1 may eliminate a need to install and execute the software applications on the device 210. In an example, the application 225-1 may include software associated with the container platform 220 and/or any other software capable of being provided via the cloud computing environment 230. In some implementations, one application 225-1 may send/receive information to/from one or more other applications 225-1, via the virtual machine 225-2.

In some example implementations, the virtual machine 225-2 may include a software implementation of a machine (e.g., a computer) that executes programs in a configuration of a physical machine. The virtual machine 225-2 may be either a system virtual machine or a process virtual machine, and may change in response to a use and/or a degree of the first application to any real machine by the virtual machine 225-2. A system virtual machine may provide a system platform that supports execution of a complete operating system. A process virtual machine may execute a single program, and may support a single process. In some implementations, the virtual machine 225-2 may execute on behalf of a user (e.g., a user of the device 210, an operator of the container platform 220, etc.), and may manage infrastructure of the cloud computing environment 230, such as data management, synchronization, or data transfers.

In some example implementations, the virtualized storage 225-3 may include one or more storage systems and/or one or more devices that use virtualization techniques within the storage systems or devices of the computing resources 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. File virtualization may enable optimization of storage use, server consolidation, and/or performance of non-disruptive file migrations.

In some example implementations, the hypervisor 225-4 may provide hardware virtualization techniques that allow multiple operating systems (e.g., "guest operating systems") to execute concurrently on a host computer, such as the computing resources 225. The hypervisor 225-4 may present a virtual operating platform to the guest operating systems, and may manage the execution of the guest operating systems. Multiple instances of a variety of operating systems may share virtualized hardware resources.

In some example implementations, the network 240 may include one or more wired and/or wireless networks. In an example, the network 240 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, and/or the like, and/or a combination of these or other types of networks.

The number and/or arrangement of devices and networks illustrated in FIG. 2 are provided as an example. There may be additional devices and/or networks, fewer devices and/or networks, different devices and/or networks, or differently arranged devices and/or networks than illustrated in FIG. 2. Two or more devices illustrated in FIG. 2 may be implemented within a single device, or a single device illustrated in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
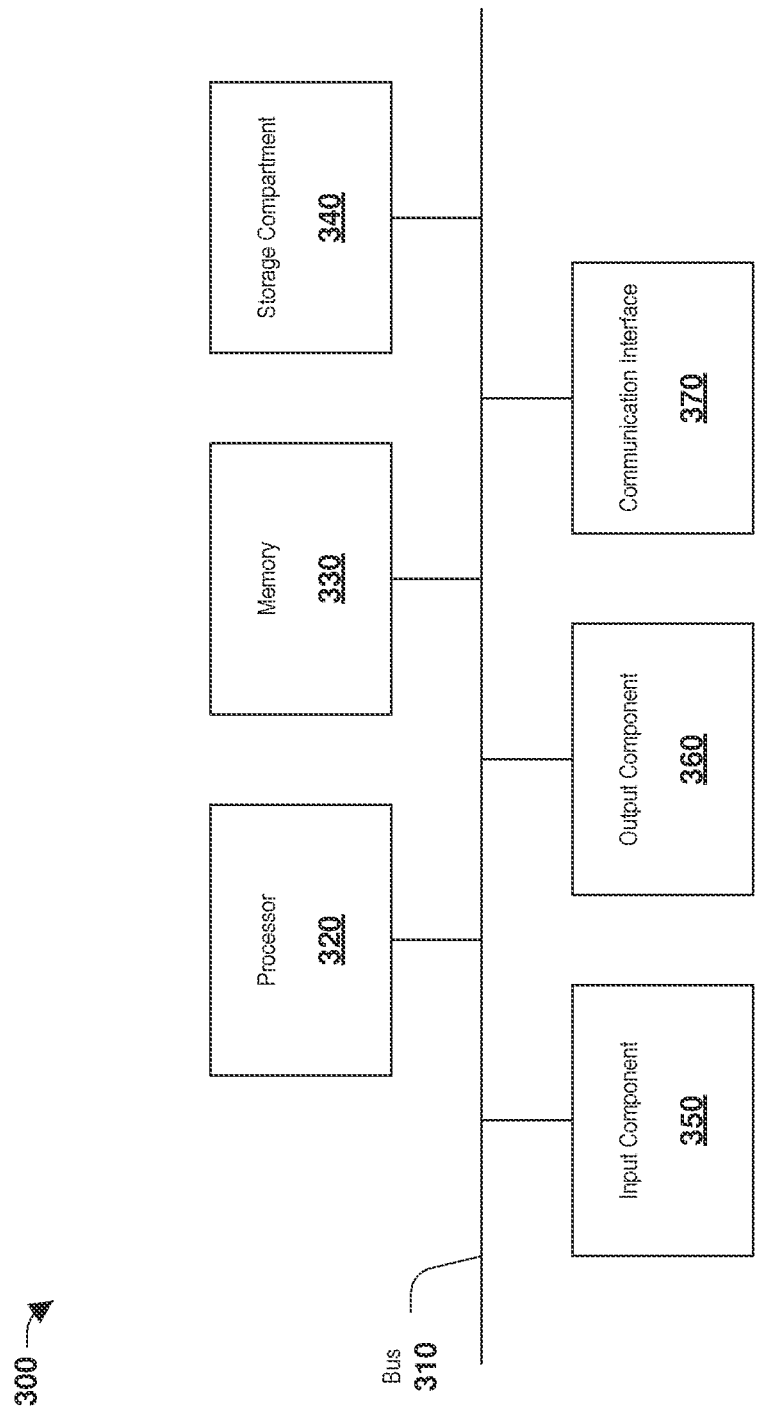
FIG. 3 is an illustration of example components of a device, according to some example embodiments.

FIG. 3 is an illustration of example components of a device 300, according to some example embodiments. The device 300 may correspond to the INAM system 102, a device associated with the INAM system 102 (e.g., the client device 104, a client device associated with the wireline resources 118, a client device associated with the wireless resources 120, etc.), a device responding to and/or communicating with the INAM system 102, the RPA engine 127 and/or the device 210 of FIG. 2.

As illustrated in FIG. 3, the device 300 may include a bus 310, a processor 320, a memory 330, a storage component 340, an input component 350, an output component 360, and a communication interface 370. The bus 310 may include a component that permits communication among the components of the device 300. The processor 320 may be implemented in hardware, firmware, or a combination of hardware and software. The processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 may include one or more processors capable of being programmed to perform a function. The memory 330 may include a random access memory (RAM), a read only memory (ROM), and/or another type of dynamic or static storage device (e.g., a flash memory, a magnetic memory, and/or an optical memory) that stores information and/or instructions for use by the processor 320.

In some embodiments, the storage component 340 may store information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The input component 350 may include a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 may include a component that provides output information from device 300 (e.g., a display, a speaker, and/or one or more light-emitting diodes (LEDs)). The communication interface 370 may include a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

In some embodiments, the device 300 may perform one or more processes described herein. The device 300 may perform these processes based on the processor 320 executing software instructions stored by a non-transitory computer-readable medium, such as the memory 330 and/or the storage component 340. A computer-readable medium may be defined herein as a non-transitory memory device. A memory device includes memory space within a single physical storage device or memory space spread across multiple physical storage devices. Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. The number and arrangement of the components shown in FIG. 3 are provided as an example. In practice, the device 300 may include additional components, fewer components, different components, or differently arranged components than those shown in FIG. 3. Additionally, or alternatively, a set of components (e.g., one or more components) of device 300 may perform one or more functions described as being performed by another set of components of the device 300.

Figure 4:
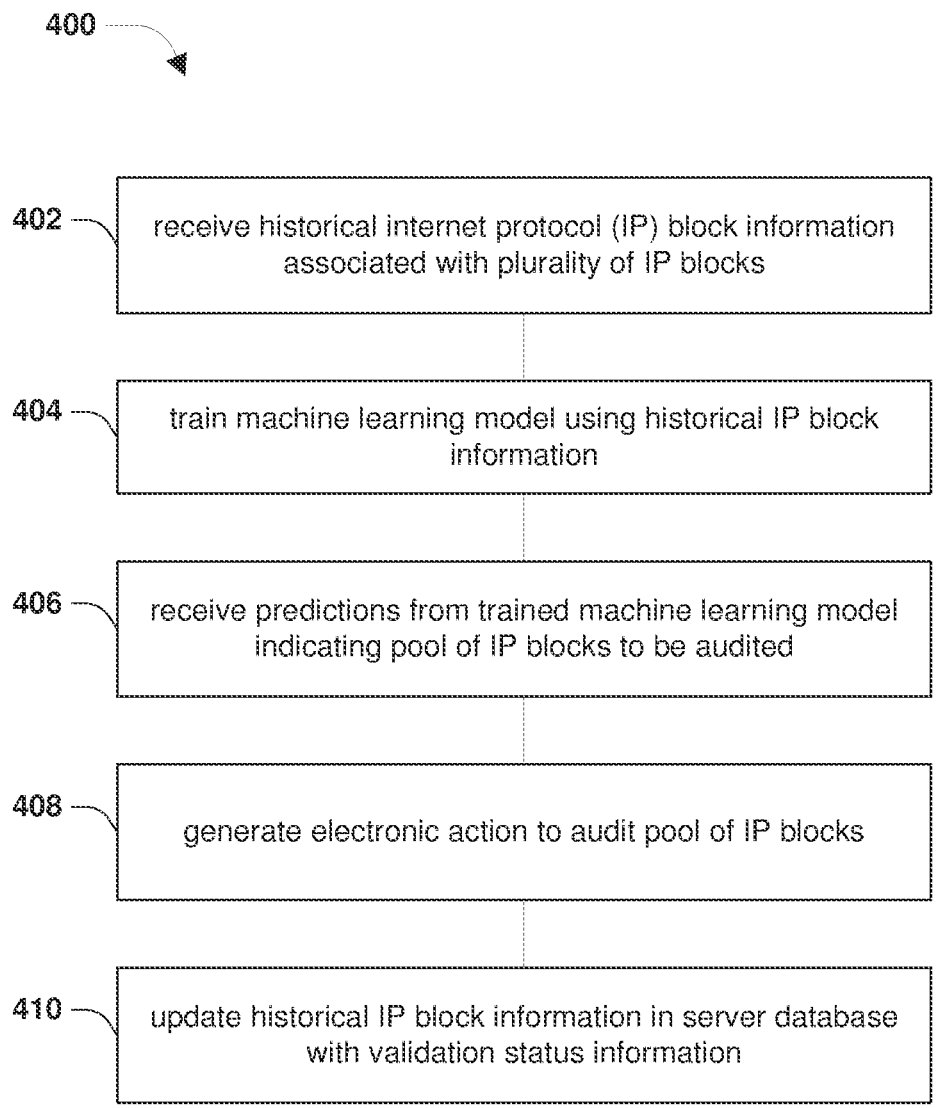
FIG. 4 is a flow chart of an example method 400, according to some example embodiments.

FIG. 4 is a flow chart of an example method 400, according to some example embodiments. At 402, historical internet protocol (IP) block information associated with plurality of IP blocks may be received. For example, as illustrated in FIG. 1B, IP block information associated with the IP blocks 140 may be received by the ML model 114 of the INAM system 102. At 404, the machine learning model may be trained using historical IP block information. For example, the ML model 114, as illustrated in FIG. 1B, may be trained using historical IP block information, such as the IP block attributes 156 illustrated in FIG. 1G. At 406, predictions may be received from the trained machine learning model indicating a pool of IP blocks to be audited. For example, IP block allocations may be clustered by attributes at 182 illustrated in FIG. 1K. For example, IP block allocations may be clustered and presented as an electronic action at 196 as illustrated in FIG. IL. At 408, an electronic action may be generated based on predictions to audit the pool of IP blocks to obtain validation status information for each IP block of the pool of IP blocks. For example, as illustrated in FIG. 1B, the INAM system 102 may include an audit action 146a of a pool of IP blocks to obtain validation status information. At 410, historical IP block information in a server database is updated with the validation status information for each IP block of the pool of IP blocks. For example, the INAM system 102 updates the historical IP block information in the server database 136 with the validation status information for each IP block of the pool of IP blocks as illustrated in FIG. 1A.

Figure 5:
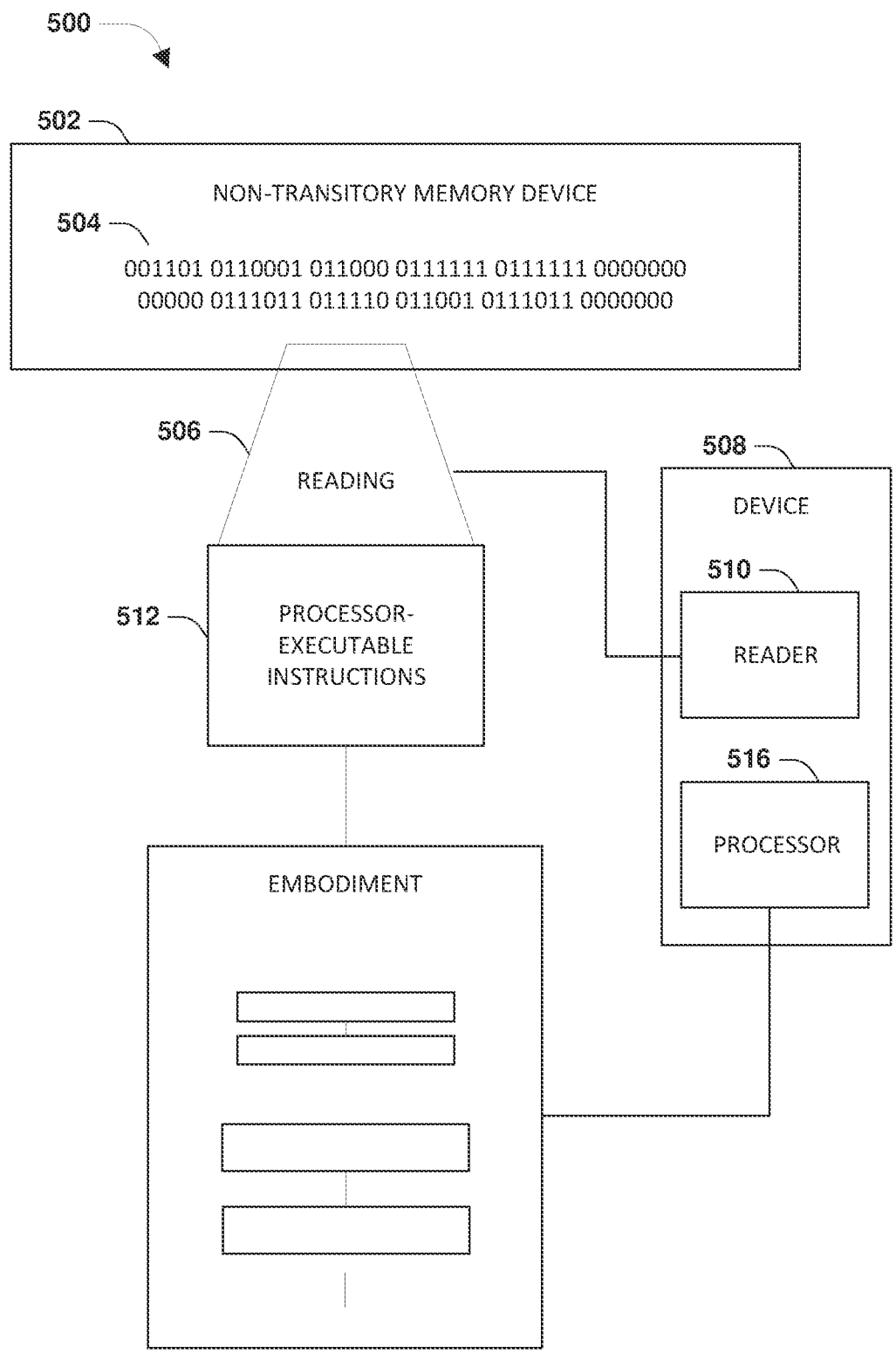
FIG. 5 is an illustration of a scenario involving an example non-transitory machine readable medium.

FIG. 5 is an illustration of a scenario 500 involving an example non-transitory machine readable medium 502. The example non-transitory machine readable medium 502 may comprise processor-executable instructions 512 that when executed by a processor 516 cause performance (e.g., by the processor 516) of at least some of the provisions herein. The example non-transitory machine readable medium 502 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 502 stores computer-readable data 504 that, when subjected to reading 506 by a reader 510 of a device 508 (e.g., a read head of a hard disk drive, or a read operation invoked on a solid-state storage device), express the processor-executable instructions 512. In some embodiments, the processor-executable instructions 512, when executed cause performance of operations, such as at least some of the example method 400 of FIG. 4, for example. In some embodiments, the processor-executable instructions 512 are configured to cause implementation of a system, such as at least some of the INAM system 102 of FIGS. 1A-1L, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A device, comprising:
   one or more processors configured to:
   receive, from a server database, historical internet protocol (IP) block information associated with a plurality of IP blocks corresponding to an IP block owner, the historical IP block information including, for each of the plurality of IP blocks, IP block size information and IP block type information;
   train a machine learning model based on the historical IP block information;
   receive predictions from the trained machine learning model indicating a pool of IP blocks of the plurality of IP blocks to be audited,
   wherein the pool of IP blocks indicated by the predictions from the trained machine learning model corresponds to a subset of the plurality of IP blocks corresponding to the IP block owner,
   wherein at least some IP blocks of the plurality of IP blocks are not in the pool of IP blocks indicated by the predictions from the trained machine learning model;
   cluster the pool of IP blocks into sets of IP blocks, using the trained machine learning model, based on the historical IP block information;
   analyze the sets of IP blocks, using the trained machine learning model, to determine an order for auditing the sets of IP blocks;
   generate an electronic action, based on the predictions, to audit the sets of IP blocks in the determined order to obtain validation status information for each IP block of the sets of IP blocks; and
   update the historical IP block information in the server database with the validation status information for each IP block of the sets of IP blocks.

2. The device of claim 1, wherein the one or more processors are further configured to:
   identify each IP address associated with the pool of IP blocks;
   perform a first validation test associated with each identified IP address to obtain a corresponding first validation status indicating that the identified IP address is unassigned;
   group each identified IP address into a set of unassigned IP addresses based on each corresponding first validation status;
   analyze the set of unassigned IP addresses to determine contiguous IP blocks of unassigned IP addresses;
   assign unassigned status information to each contiguous IP block of unassigned IP addresses indicating that all corresponding IP addresses are unassigned; and
   register, in the server database, each contiguous IP block of unassigned IP addresses as an audited IP block with corresponding validation status information including the unassigned status information.

3. The device of claim 1, wherein the one or more processors are further configured to:
receive, from a server database, second historical IP block information associated with a second plurality of IP blocks corresponding to the IP block owner, the second historical IP block information including, for each of the second plurality of IP blocks, IP block size information and IP block type information;
train the machine learning model based on the second historical IP block information;
receive second predictions from the trained machine learning model indicating a second pool of IP blocks of the second plurality of IP blocks to be audited;
generate a second electronic action, based on the received second predictions, to audit the second pool of IP blocks to obtain second validation status information for each IP block of the second pool of IP blocks; and
update the second historical IP block information in the server database with the second validation status information for each IP block of the second pool of IP blocks.

4. The device of claim 1,
wherein the IP block type information includes, for each of the plurality of IP blocks, at least one of:
an IP block growth attribute indicating an anticipated growth rate of IP addresses associated with a corresponding IP block,
an IP block product attribute indicating a product lifecycle associated with a corresponding IP block,
an IP block time in service attribute indicating a time in service of a corresponding IP block, or
an IP block assignment size attribute indicating a percentage of assigned IP addresses associated with a corresponding IP block.

5. The device of claim 4, where the one or more processors are further configured to:
automatically train the machine learning model based on the IP block type information; and
automatically receive one or more predictions, of the predictions, from the trained machine learning model indicating the pool of IP blocks of the plurality of IP blocks to be audited.

6. The device of claim 1, where the one or more processors are further configured to:
assign, for each IP block of the plurality of IP blocks, a first weight to a first IP block attribute of the IP block type information;
assign, for each IP block of the plurality of IP blocks, a second weight to a second IP block attribute of the IP block type information;
compare, for each IP block of the plurality of IP blocks, the first assigned weight and the second assigned weight to generate a normalized weight for a corresponding IP block based on a statistical machine learning model; and
analyze each normalized weight corresponding to each IP block of the plurality of IP blocks to generate the predictions indicating the pool of IP blocks of the plurality of IP blocks to be audited.

7. The device of claim 1, wherein the one or more processors are further configured to:
select an IP block of the pool of IP blocks based on the received predictions from the trained machine learning model;
identify each IP address associated with the selected IP block;
perform a first validation test associated with each identified IP address to obtain a corresponding first validation status;
perform, based on the first validation status, a second validation test associated with each identified IP address to obtain a second validation status; and
update the historical IP block information in the server database for the selected IP block with the validation status information based on the first validation status or the second validation status.

8. The device of claim 7, wherein the one or more processors are further configured to:
automatically perform, based on the first validation status and the second validation status, a third validation test associated with each identified IP address to obtain a corresponding third validation status; and
update the historical IP block information in the server database for the selected IP block with the validation status information based on the first validation status, the second validation status, and the third validation status.

9. The device of claim 7, wherein the one or more processors, to perform the first validation test, are further configured to:
receive, from the server database, an IP address owner attribute corresponding to each identified IP address;
poll a routing device for each identified IP address;
receive, from the routing device, a route statement corresponding to each polled IP address, the route statement including polled IP address owner information;
compare, for each identified IP address, the polled IP address owner information with the received IP address owner attribute; and
generate, for each identified IP address, the first validation status based on the comparison of the polled IP address owner information and the received IP address owner attribute.

10. The device of claim 9, wherein the one or more processors are further configured to:
determine, from the received route statement for each polled IP address, whether each polled IP address has an associated route configured to communicate information; and
when the associated route for each polled IP address is not configured to communicate information, build a new route for each polled IP address.

11. The device of claim 7, wherein the one or more processors, to perform the second validation test, are further configured to:
receive, from the server database, an IP address owner attribute associated with each identified IP address;
poll an internet routing registry (IRR) database, for each identified IP address, with a public autonomous system number (ASN) corresponding to the IP address owner attribute;
receive, from the IRR database, IRR owner information for each identified IP address corresponding to the polled public ASN;
compare, for each identified IP address, the received IRR owner information with the IP address owner attribute; and
generate, for each identified IP address, the second validation status based on the comparison of the received IRR owner information and the IP address owner attribute.

12. The device of claim 7, wherein the one or more processors, to perform the second validation test, are further configured to:
receive, from the server database, a domain name and an IP block owner attribute associated with the selected IP block;
poll a WHOIS database, for the selected IP block, with the received domain name;
receive, from the WHOIS database, registered owner information for the selected IP block corresponding to the received domain name;
compare, for the selected IP block, the registered owner information with the received IP block owner attribute; and
generate, for the selected IP block, the second validation status based on the comparison of the registered owner information and the received IP block owner attribute.

13. The device of claim 1, wherein the one or more processors are further configured to:
provide for presentation, using a robotic process automation (RPA), electronic actions derived from the predictions from the trained machine learning model; and
record, using the trained machine learning model, one or more user selections of at least one electronic action of the electronic actions.

14. A method, comprising:
receiving, by a device, historical internet protocol (IP) block information associated with a plurality of IP blocks corresponding to an IP block owner, the historical IP block information including, for each of the plurality of IP blocks, IP block size information and IP block type information;
training, by the device, a machine learning model based on the historical IP block information;
receiving, by the device, predictions from the trained machine learning model indicating a pool of IP blocks of the plurality of IP blocks to be audited,
wherein the pool of IP blocks indicated by the predictions from the trained machine learning model corresponds to a subset of the plurality of IP blocks corresponding to the IP block owner,
wherein at least some IP blocks of the plurality of IP blocks are not in the pool of IP blocks indicated by the predictions from the trained machine learning model;
generating, by the device, an electronic action, based on the received predictions, to audit the pool of IP blocks to obtain validation status information for each IP block of the pool of IP blocks corresponding to the subset of the plurality of IP blocks;
updating, by the device, the historical IP block information in a server database with the validation status information for each IP block of the pool of IP blocks;
identifying, by the device, each IP address associated with the pool of IP blocks;
performing, by the device, a first validation test associated with each identified IP address to obtain a corresponding first validation status indicating that the identified IP address is unassigned;
grouping, by the device, unassigned IP addresses into a set of unassigned IP addresses based on each corresponding first validation status;
analyzing, by the device, the set of unassigned IP addresses to determine contiguous IP blocks of unassigned IP addresses;
assigning, by the device, unassigned status information to each contiguous IP block of unassigned IP addresses indicating that all corresponding IP addresses are unassigned; and
registering, by the device and in the server database, each contiguous IP block of unassigned IP addresses as an audited IP block with corresponding validation status information including the unassigned status information.

15. The method of claim 14, further comprising:
performing, by the device, a second validation test associated with each identified IP address to obtain a second validation status; and
updating, by the device, a portion of the historical IP block information in the server database for the selected IP block with the validation status information based on the second validation status.

16. The method of claim 15, further comprising:
automatically performing, by the device and based on the second validation status, a third validation test associated with each identified IP address to obtain a third validation status; and
updating, by the device, the historical IP block information in the server database for the selected IP block with the validation status information based on the second validation status and the third validation status.

17. The method of claim 14, further comprising:
receiving, by the device, second historical IP block information associated with a second plurality of IP blocks corresponding to the IP block owner, the second historical IP block information including, for each of the second plurality of IP blocks, IP block size information and IP block type information;
training, by the device, the machine learning model based on the second historical IP block information;
receiving, by the device, second predictions from the trained machine learning model indicating a second pool of IP blocks of the second plurality of IP blocks to be audited;
generating, by the device, a second electronic action, based on the received second predictions, to audit the second pool of IP blocks to obtain second validation status information for each IP block of the second pool of IP blocks; and
updating, by the device, the second historical IP block information in the server database with the second validation status information for each IP block of the second pool of IP blocks.

18. The method of claim 14, further comprising:
clustering, by the device, the pool of IP blocks into sets of IP blocks using the trained machine learning model based on the historical IP block information;
analyzing, by the device, the sets of IP blocks, using the trained machine learning model to determine an order for auditing the sets of IP blocks; and
automatically generating the electronic action to audit the sets of IP blocks in the determined order.

19. A non-transitory computer-readable medium storing instructions, the instructions comprising:
one or more instructions that, when executed by one or more processors of a device, cause the one or more processors to:
receive, from a server database, historical internet protocol (IP) block information associated with a plurality of IP blocks corresponding to an IP block owner, the historical IP block information including, for each of the plurality of IP blocks, IP block size information and IP block type information;

train a machine learning model based on the historical IP block information;

assign, for each IP block of the plurality of IP blocks, a first weight to a first IP block attribute of the IP block type information;

assign, for each IP block of the plurality of IP blocks, a second weight to a second IP block attribute of the IP block type information;

compare, for each IP block of the plurality of IP blocks, the first assigned weight and the second assigned weight to generate a normalized weight for a corresponding IP block based on a statistical machine learning model;

analyze each normalized weight corresponding to each IP block of the plurality of IP blocks to generate, using the trained machine learning model, predictions indicating a pool of IP blocks of the plurality of IP blocks to be audited, wherein the pool of IP blocks indicated by the predictions generated using the trained machine learning model corresponds to a subset of the plurality of IP blocks corresponding to the IP block owner, wherein at least some IP blocks of the plurality of IP blocks are not in the pool of IP blocks indicated by the predictions generated using the trained machine learning model;

generate an electronic action, based on the generated predictions, to audit the pool of IP blocks to obtain validation status information for each IP block of the pool of IP blocks corresponding to the subset of the plurality of IP blocks; and update the historical IP block information in the server database with the validation status information for each IP block of the pool of IP blocks.

* * * * *